(12) United States Patent
Moyer et al.

(10) Patent No.: US 6,505,290 B1
(45) Date of Patent: *Jan. 7, 2003

(54) METHOD AND APPARATUS FOR INTERFACING A PROCESSOR TO A COPROCESSOR

(75) Inventors: William C. Moyer, Dripping Springs, TX (US); John Arends, Austin, TX (US); Jeffrey W. Scott, Austin, TX (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,518

(22) Filed: Sep. 5, 1997

(51) Int. Cl.⁷ ............................................. G06F 15/00
(52) U.S. Cl. ..................................................... 712/34
(58) Field of Search ........................... 395/800.34, 500; 712/34, 35, 220

(56) References Cited

U.S. PATENT DOCUMENTS

| | | | |
|---|---|---|---|
| 4,270,167 A | | 5/1981 | Koehler et al. ............. 364/200 |
| 4,509,116 A | | 4/1985 | Lackey et al. ............... 364/200 |
| 4,547,849 A | | 10/1985 | Louis et al. ................ 364/200 |
| 4,715,013 A | | 12/1987 | MacGregor et al. ......... 364/900 |
| 4,731,736 A | | 3/1988 | Mothersole et al. ........ 364/900 |
| 4,991,078 A | | 2/1991 | Wilhelm et al. ............ 364/200 |
| 5,001,624 A | | 3/1991 | Hoffman et al. ............ 364/200 |
| 5,150,474 A | * | 9/1992 | Kaneko ....................... 395/500 |
| 5,247,650 A | * | 9/1993 | Judd et al. .................. 395/500 |
| 5,345,566 A | * | 9/1994 | Tanji et al. ................. 395/325 |
| 5,577,250 A | | 11/1996 | Anderson et al. ........... 395/670 |
| 5,603,047 A | | 2/1997 | Caulk, Jr. ................... 395/800 |
| 5,706,478 A | * | 1/1998 | Dye ............................. 395/503 |
| 5,708,784 A | * | 1/1998 | Yanai et al. ................ 395/299 |

FOREIGN PATENT DOCUMENTS

| | | | |
|---|---|---|---|
| EP | 0 092 429 A2 | 10/1983 | ............. G06F/9/38 |
| EP | 0 261 685 A2 | 3/1988 | ........... G06F/13/12 |
| EP | 0 280 821 A2 | 9/1988 | ............. G06F/9/38 |
| GB | 2 326 253 A | 12/1998 | ........... G06F/9/345 |

OTHER PUBLICATIONS

S.B. Furber: Coprocessor Data Transfer Instructions', VLSI RISC Architecture and Organization, pp. 261–265, XP–002061358ISBN 0–8247–8151–1.

Motorola Inc. 1990, "M68300 Family CPU32 Central Processor Unit Reference Manual", Section 7 Development Support, pp. 7–1 through 7–31.

Motorola Inc. 1995, "DSP56300 24–Bit Digital Signal Processor Family Manual", Section 10 On–Chip Emulator (OnCE™), pp. 10–1 through 10–29.

Motorola Inc. 1995, "DSP56300 24–Bit Digital Signal Processor Family Manual", Section 11 JTAG (IEEE 1149.1) Test Access Port, pp. 11–1 through 11–9.

* cited by examiner

*Primary Examiner*—John A. Follansbee
(74) *Attorney, Agent, or Firm*—Susan C. Hill; Joanna P. Gariazzo

(57) ABSTRACT

A processor (12) to coprocessor (14) interface supporting multiple coprocessors (14, 16) utilizes compiler generatable software type function call and return, instruction execute, and variable load and store interface instructions. Data is moved between the processor (12) and coprocessor (14) on a bi-directional shared bus (28) either implicitly through register snooping and broadcast, or explicitly through function call and return and variable load and store interface instructions. The load and store interface instructions allow selective memory address preincrementation. The bi-directional bus (28) is potentially driven both ways on each clock cycle. The interface separates interface instruction decode and execution. Pipelined operation is provided by indicating decoded instruction discard by negating a decode signal before an execute signal is asserted.

13 Claims, 25 Drawing Sheets

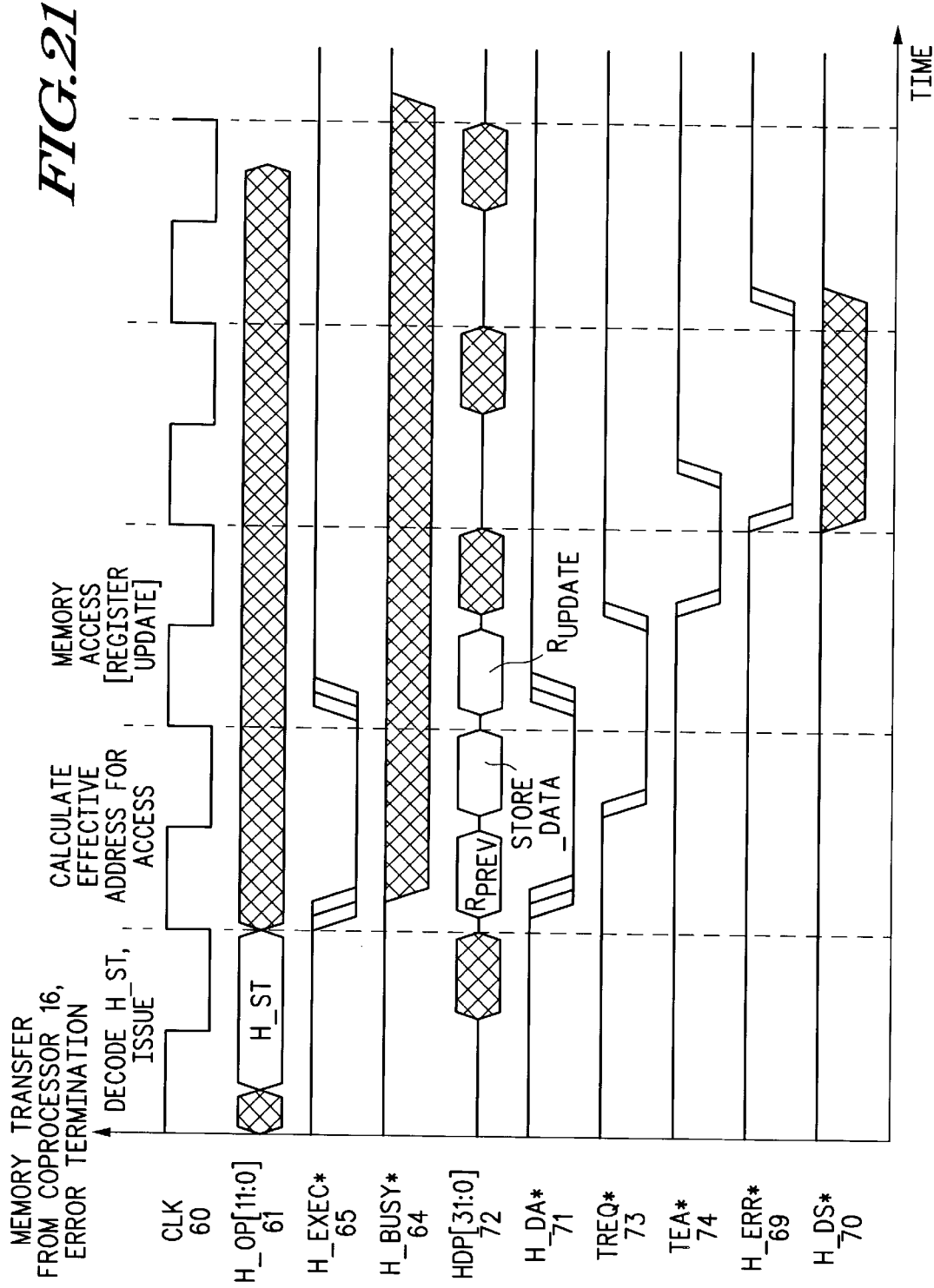

| H_CALL | HARDWARE ACCELERATOR (COPROCESSOR) CALL PRIMITIVE |
|---|---|
| OPERATION: | PASS PARAMETERS TO HARDWARE ACCELERATOR |
| ASSEMBLER SYNTAX: | H_CALL #UU, R4-RLAST, #CODE |
| DESCRIPTION: | H_CALL PASSES A SET OF REGISTER-BASED PARAMETERS AND A CODE TO HARDWARE BLOCK (COPROCESSOR) #UU |
| CONDITION-CODE: UNAFFECTED ||

INSTRUCTION FORMAT:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | UU || 0 | 1 | 1 | CNT ||| CODE ||||

INSTRUCTION FIELDS:
   UU FIELD-SPECIFIES HARDWARE BLOCK (COPROCESSOR)
      00 - BLOCK 0
      01 - BLOCK 1
      10 - BLOCK 2
      11 - BLOCK 3
   CNT FIELD-SPECIFIES NUMBER OF REGISTERS TO PASS, BEGINNING WITH R4
      000 - RESERVED, DO NOT USE
      001 - PASS R4
         :
      111 - PASS R4-R10

*FIG.22*

| H_RET | HARDWARE ACCELERATOR (COPROCESSOR) RETURN PRIMITIVE |
|---|---|
| OPERATION: | PASS PARAMETERS FROM HARDWARE ACCELERATOR |
| ASSEMBLER SYNTAX: | H_RET #UU, R4-RLAST, #CODE |
| DESCRIPTION: | H_RET PASSES A CODE TO COPROCESSOR #UU AND RECEIVES A SET OF RETURN PARAMETERS TO BE LOADED INTO CPU REGISTERS |
| CONDITION-CODE: | UNAFFECTED |

INSTRUCTION FORMAT:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | UU | | 0 | 1 | 0 | CNT | | | CODE | | | |

INSTRUCTION FIELDS:
   UU FIELD-SPECIFIES HARDWARE BLOCK (COPROCESSOR)
     00 - BLOCK 0
     01 - BLOCK 1
     10 - BLOCK 2
     11 - BLOCK 3
   CNT FIELD-SPECIFIES NUMBER OF REGISTERS TO PASS, BEGINNING WITH R4
     000 - RESERVED, DO NOT USE
     001 - PASS R4
     010 - PASS R4-R5
     ⋮
     111 - PASS R4-R10

*FIG.23*

| | |
|---|---|
| H_EXEC | HARDWARE ACCELERATOR (COPROCESSOR) EXECUTE PRIMITIVE |
| OPERATION: | PASS EXECUTION CODE TO HARDWARE ACCELERATOR |
| ASSEMBLER SYNTAX: | H_EXEC #UU, #CODE |
| DESCRIPTION: | H_EXEC IS USED TO CONTROL A FUNCTION IN COPROCESSOR #UU. THE CODE FIELD IS NOT INTERPRETED BY THE CPU |
| CONDITION-CODE: UNAFFECTED | |

INSTRUCTION FORMAT:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | UU | | 0 | 0 | CODE | | | | | | | |

INSTRUCTION FIELDS:
   UU FIELD-SPECIFIES HARDWARE BLOCK (COPROCESSOR)
      00 – BLOCK 0
      01 – BLOCK 1
      10 – BLOCK 2
      11 – BLOCK 3
   CODE FIELD-SPECIFIES AN OPERATION CODE FOR A HARDWARE BLOCK

*FIG.24*

| H_LD | HARDWARE ACCELERATOR (COPROCESSOR) LOAD PRIMITIVE |
|---|---|
| OPERATION: | LOAD OPERAND FROM MEMORY AND PASS TO HARDWARE ACCELERATOR |
| ASSEMBLER SYNTAX: | H_LD.[HW][U] #UU, (RX, DISP)<br>H_LD.[U] #UU, (RX, DISP) |
| DESCRIPTION: | H_LD PERFORMS A LOAD OF A VALUE IN MEMORY, AND PASSES THE MEMORY OPERAND TO THE COPROCESSOR WITHOUT STORING IT IN A GPR. THE H_LD OPERATION HAS THREE OPTIONS, W-WORD, H-HALF WORD AND U-UPDATE. DISP IS OBTAINED BY SCALING THE IMM2 FIELD BY THE SIZE OF THE LOAD, AND ZERO-EXTENDING. THIS VALUE IS ADDED TO THE VALUE OF REGISTER RX AND A LOAD OF THE SPECIFIED SIZE IS PERFORMED FROM THIS ADDRESS, WITH THE RESULT OF THE LOAD PASSED TO THE HARDWARE INTERFACE. FOR HALFWORD LOADS, THE DATA FETCHED IS ZERO-EXTENDED TO TO 32-BITS. IF THE .U OPTION IS SPECIFIED, THE EFFECTIVE ADDRESS OF THE LOAD IS PLACED IN REGISTER RX AFTER IT IS CALCULATED |
| CONDITION-CODE: UNAFFECTED |

INSTRUCTION FORMAT:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | UU | | 1 | SZ | 0 | UP | IMM2 | | RX | | | |

INSTRUCTION FIELDS:
   UU FIELD-SPECIFIES HARDWARE BLOCK (COPROCESSOR)
      00 - BLOCK 0
      01 - BLOCK 1
      10 - BLOCK 2
      11 - BLOCK 3
   SIZE-SPECIFIES LOAD SIZE
      0 - WORD
      1 - HALFWORD
   UP-SPECIFIES WHETHER THE BASE REGISTER SHOULD BE UPDATED
      0 - NO UPDATE
      1 - UPDATE BASE REGISTER WITH EFFECTIVE ADDRESS
   IMM2 FIELD-SPECIFIES A 2-BIT SCALED IMMEDIATE VALUE

REGISTER X-SPECIFIES THE BASE ADDRESS TO BE ADDED TO THE SCALED IMMEDIATE FIELD

*FIG.25*

| H_ST | HARDWARE ACCELERATOR (COPROCESSOR) STORE PRIMITIVE |

| OPERATION: | STORE OPERAND TO MEMORY FROM HARDWARE ACCELERATOR |

ASSEMBLER
SYNTAX:   H_ST.[HW][U] #UU, (RX, DISP)

DESCRIPTION: H_ST PERFORMS A STORE TO MEMORY, OF AN OPERAND FROM A COPROCESSOR WITHOUT STORING IT IN A GPR. THE H_ST OPERATION HAS W-WORD, H-HALF WORD AND U-UPDATE. DISP IS OBTAINED BY SCALING THE IMM2 FIELD BY THE SIZE OF THE STORE AND ZERO-EXTENDING. THIS VALUE IS ADDED TO THE VALUE OF EGISTER RX AND STORE OF THE SPECIFIED SIZE IS PERFORMED TO THIS ADDRESS, WITH THE DATA FOR THE STORE OBTAINED FROM THE HARDWARE INTERFACE. IF THE .U OPTION IS SPECIFIED, THE EFFECTIVE ADDRESS OF THE LOAD IS PLACED IN REGISTER RX AFTER IT IS CALCULATED

CONDITION-CODE: UNAFFECTED

INSTRUCTION FORMAT:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | UU | | 1 | SZ | 1 | UP | IMM2 | | | RX | | |

INSTRUCTION FIELDS:
  UU FIELD-SPECIFIES HARDWARE BLOCK (COPROCESSOR)
    00 - BLOCK 0
    01 - BLOCK 1
    10 - BLOCK 2
    11 - BLOCK 3
  SIZE-SPECIFIES STORE SIZE
    0 - WORD
    1 - HALFWORD
  UP-SPECIFIES WHETHER THE BASE REGISTER SHOULD BE UPDATED
    0 - NO UPDATE
    1 - UPDATE BASE REGISTER WITH EFFECTIVE ADDRESS
  IMM2 FIELD-SPECIFIES A 2-BIT SCALED IMMEDIATE VALUE
  REGISTER X-SPECIFIES THE BASE ADDRESS TO BE ADDED TO THE SCALED IMMEDIATE FIELD

*FIG.26*

METHOD AND APPARATUS FOR INTERFACING A PROCESSOR TO A COPROCESSOR

CROSS REFERENCE TO RELATED APPLICATIONS

The present application is related to the following U.S. patent applications:

"METHOD AND APPARATUS FOR INTERFACING A PROCESSOR TO A COPROCESSOR" invented by William C. Moyer et. al., having Ser. No. 08/924,508, filed concurrently herewith, and assigned to the assignee hereof; and "METHOD AND APPARATUS FOR INTERFACING A PROCESSOR TO A COPROCESSOR" invented by William C. Moyer et. al., having Ser. No. 08/924,137, filed concurrently herewith, and assigned to the assignee hereof.

FIELD OF THE INVENTION

The present invention relates in general to a data processing system having a processor and at least one coprocessor, and, more particularly, to a method and apparatus for interfacing the processor to the coprocessor.

BACKGROUND OF THE INVENTION

The ability to extend a baseline architecture processor functionality through dedicated and specialized hardware functional elements is an important aspect of scaleable and extensible architectures.

One of the preferred methods for extending a baseline architecture processor functionality is through the use of coprocessors. These are dedicated usually single purpose processors that operate at the direction of a processor. One of the traditional uses of coprocessors was as math coprocessors to selectively provide floating point capabilities to architectures that did not directly support such. Some example of such math coprocessors are the Intel 8087 and 80287. Some other potential uses or types of coprocessors include: multiply-accumulators, modulator/demodulators (modems), digital signal processors (DSP), vitturbi calculators, cryptographic processors, image processors, and vector processors.

There have been two different approaches to coprocessors. On the one hand, the floating point unit for the Digital Equipment Corporation (DEC) PDP-11 family of computers was very tightly coupled to its primary processor. One problem that arose is that this tightly coupling required the primary processor to know a substantial amount about the operation of the coprocessor. This complicates circuit design to such an extent that addition of a new coprocessor into an integrated system is a major engineering problem.

The alternative implementation has been to loosely couple the coprocessor to the primary processor. This did have the advantage of abstracting and isolating the operation of the coprocessor from the primary processor, and thus substantially lessening the effort required to integrate a new coprocessor with an existing processor. However, this invariably came at a price. Loss of performance is one problem of this approach. One problem with taking the type of performance hit resulting from this loose coupling is that the break-even point for invoking such a coprocessor is increased correspondingly. Thus, many otherwise attractive applications for coprocessors are not cost effective. Additionally, such an approach often requires use of a bus, with all of the corresponding additional circuitry and chip area.

It is thus important to have a coprocessor interface that is tightly coupled enough that usage of the interface is fast enough that invoking even fairly simple functions is advantageous, while abstracting the interface to such an extent that the processor architecture is isolated from as many of the details of any given coprocessor as possible. Part of this later includes making the interface programmer friendly in order to facilitate tailoring new coprocessor applications in software instead of in hardware.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 21 is a timing diagram that illustrates the protocol signals when the store results in an access error;

FIG. 22 illustrates an instruction format for the H_CALL primitive, in accordance with the present invention;

FIG. 23 illustrates an instruction format for the H_RET primitive, in accordance with the present invention;

FIG. 24 illustrates an instruction format for the H_EXEC primitive, in accordance with the present invention;

FIG. 25 illustrates an instruction format for the H_LD instruction, in accordance with the present invention; and FIG. 26 illustrates an instruction format for the H_ST instruction, in accordance with the present invention.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Figure 1:
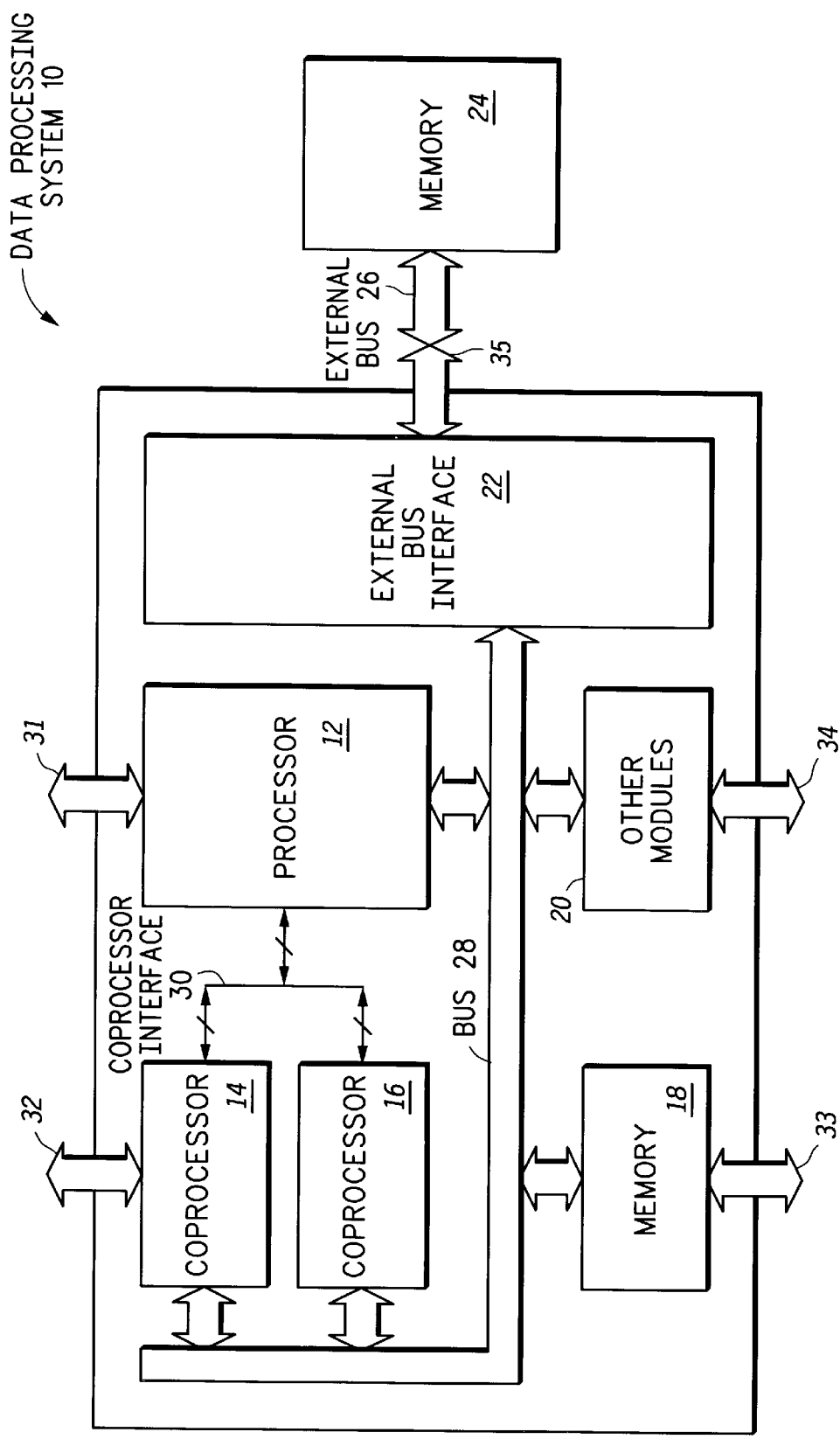
FIG. 1 is a block diagram illustrates one embodiment of a data processing system, in accordance with the present invention.

FIG. 1 is a block diagram that illustrates one embodiment of a data processing system 10 includes a processor 12, a coprocessor 14, a coprocessor 16, a memory 18, other modules 20 and external bus interface 22 which are all bidirectionally coupled by way of bus 28. Alternate embodiments of the present invention may have only one coprocessor 14, two coprocessors 14 and 16 or even more coprocessors (not shown). External bus interface 22 is bidirectionally coupled to external bus 26 by way of integrated circuit terminals 35. Memory 24 is bidirectionally coupled to external bus 26. Processor 12 may optionally be coupled external to data processing system 10 by way of integrated circuit terminals 31. Coprocessor 14 may optionally be coupled external to data processing system 10 by way of integrated circuit terminals 32. Memory 18 may optionally be coupled external to data processing system 10 by way of integrated circuit terminals 33. Other modules 20 may optionally be coupled external to data processing system 10 by way of integrated circuit terminals 34. Processor 12 is bidirectionally coupled to both coprocessor 14 and coprocessor 16 by way of coprocessor interface 30.

Figure 2:
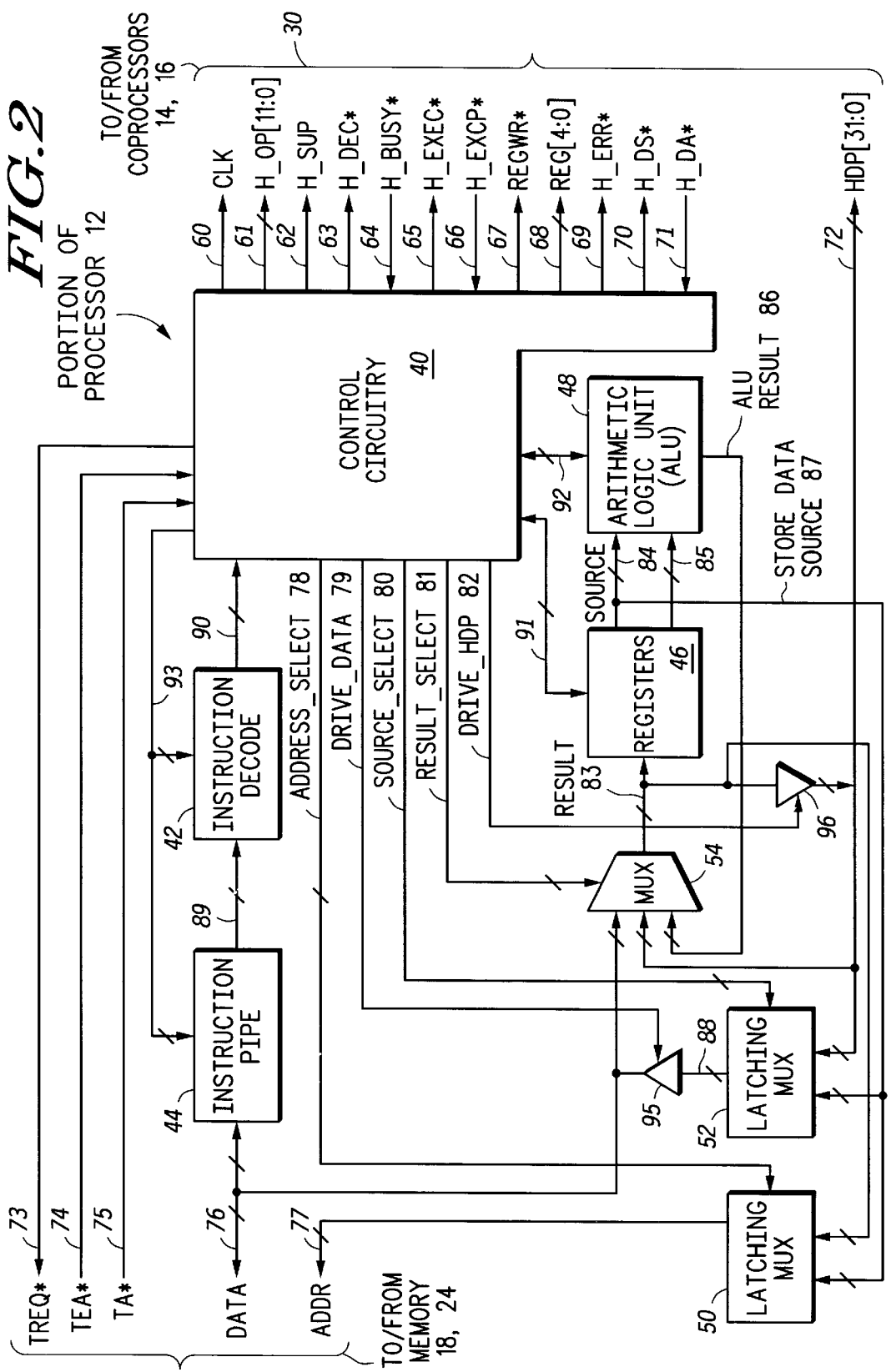
FIG. 2 is a block diagram that illustrates a portion of processor of FIG. 1.

FIG. 2 is a block diagram that illustrates a portion of processor 12 of FIG. 1. In one embodiment processor 12 includes control circuitry 40, instruction decode circuitry 42, instruction pipe 44, registers 46, arithmetic logic unit (ALU) 48, latching multiplexer (MUX) 50, latching multiplexer (MUX) 52, and multiplexer (MUX) 54. In one embodiment of the present invention, coprocessor interface 30 includes signals 60–71. Clock signal 60 is generated by control circuitry 40. Coprocessor operation signals 61 are generated by control circuitry 40 and are provided to coprocessors 14 and 16.

Supervisor mode signal 62 is generated by control circuitry 40 and is provided to coprocessors 14 and 16. Decode signal 63 is generated by control circuitry 40 and is provided to coprocessor 14 and 16. Coprocessor busy signal 64 is received by control circuitry 40 from coprocessor 14 or coprocessor 16. Execute signal 65 is generated by control circuitry 40 and is provided to coprocessors 14 and 16. Exception signal 66 is received by control circuitry 40 from coprocessor 14 or coprocessor 16. Register write (REGWR*) signal 67 is generated by control circuitry 40 and is provided to coprocessors 14 and 16. Register signals (REG{4:0}) 68 are generated by control circuitry 40 and are provided to coprocessors 14 and 16. Error signal (H_ERR*) 69 is generated by control circuitry 40 and is provided to coprocessors 14 and 16. Data strobe signal (H_DS*) 70 is generated by control circuitry 40 and is provided to coprocessors 14 and 16. Data acknowledge signal (H_DA*) 71 is received by control circuitry 40 from coprocessor 14 or coprocessor 16. Hardware data ports signal (HDP{31:0} 72 which are also considered part of coprocessor interface 30 are bi-directional between coprocessors 14 and 16 and internal circuitry within processor 12.

In one embodiment of the present invention a plurality of signals are provided to or from bus 28 in order to load or store data in memory 18 and/or memory 24. In one embodiment these signals include a transfer request signal (TREQ*) 73 that is generated by control circuitry 40 and provided to bus 28. Transfer error acknowledge signal (TEA*) 74 is provided to control circuitry 40 by way of bus 28. Transfer acknowledge signal (TA*) 75 is provided to control circuitry 40 by way of bus 28. Instructions are provided from bus 28 to instruction pipe 44 by way of conductors 76. Data is provided to MUX 54 by way of conductors 76. Drive Data signal 79 enables tristate buffer 95 to provide data from latching MUX 52 by way of conductors 88 and 76. Address Select signal 78 enables latching MUX 50 to provide addresses to bus 28 by way of conductors 77. Another input to MUX 54 is provided by the HDP signal (HDP{31:0}) 72. Another input to MUX 54 is provided by way of the ALU result conductors 86. The output of MUX 54, result signals 83, are provided to registers 46 and to the input of tristate buffer 96. Drive HDP signal 82 enables tristate buffer 96 to drive result signals 83 on the HDP signals 72. The output of tristate buffer 96 is also coupled to the input of latching MUX 52. Alternate embodiments of the present invention may include any number of registers in registers 46. Result signals 83 are provided as an input to latching MUX 50. Result signals 83 are provided to registers 46 by way of MUX 54. Result Select signal (RESULT_SELECT) 81 selects which input of MUX 54 is to be driven on result conductors 83. Source select signal (SOURCE_SELECT) 80 is provided to latching MUX 52 to select which signal shall be driven to tristate buffer 95 on conductors 88. Control circuitry 40 provides control information and receives status information from registers 46 by way of conductors 91. Control circuitry 40 provides control signals and receives status signals from arithmetic logic unit 48 by way of conductors 92. Control circuitry 40 provides control signals and receives status signals from instruction pipe 44 and instruction decode circuitry 42 by way of conductors 93. Instruction pipe 44 is coupled to provide instructions to instruction decode circuitry 42 by way of conductors 89.

Instruction decode circuitry 42 provides decoded instruction information to control circuitry 40 by way of conductors 90. Registers 46 provide source operands to arithmetic logic unit 48 by way of conductors 84. Registers 46 provide data to be stored in memory 18 or memory 24 by way of conductors 84, latching MUX 52, tristate buffer 95 and conductor 76. Register 46 provide address information to memory 18 or memory 24 by way of conductors 84, latching MUX 50 and address conductor 77. Registers 46 provide a second source operand to arithmetic logic unit 48 by way of conductors 85.

Figure 3:
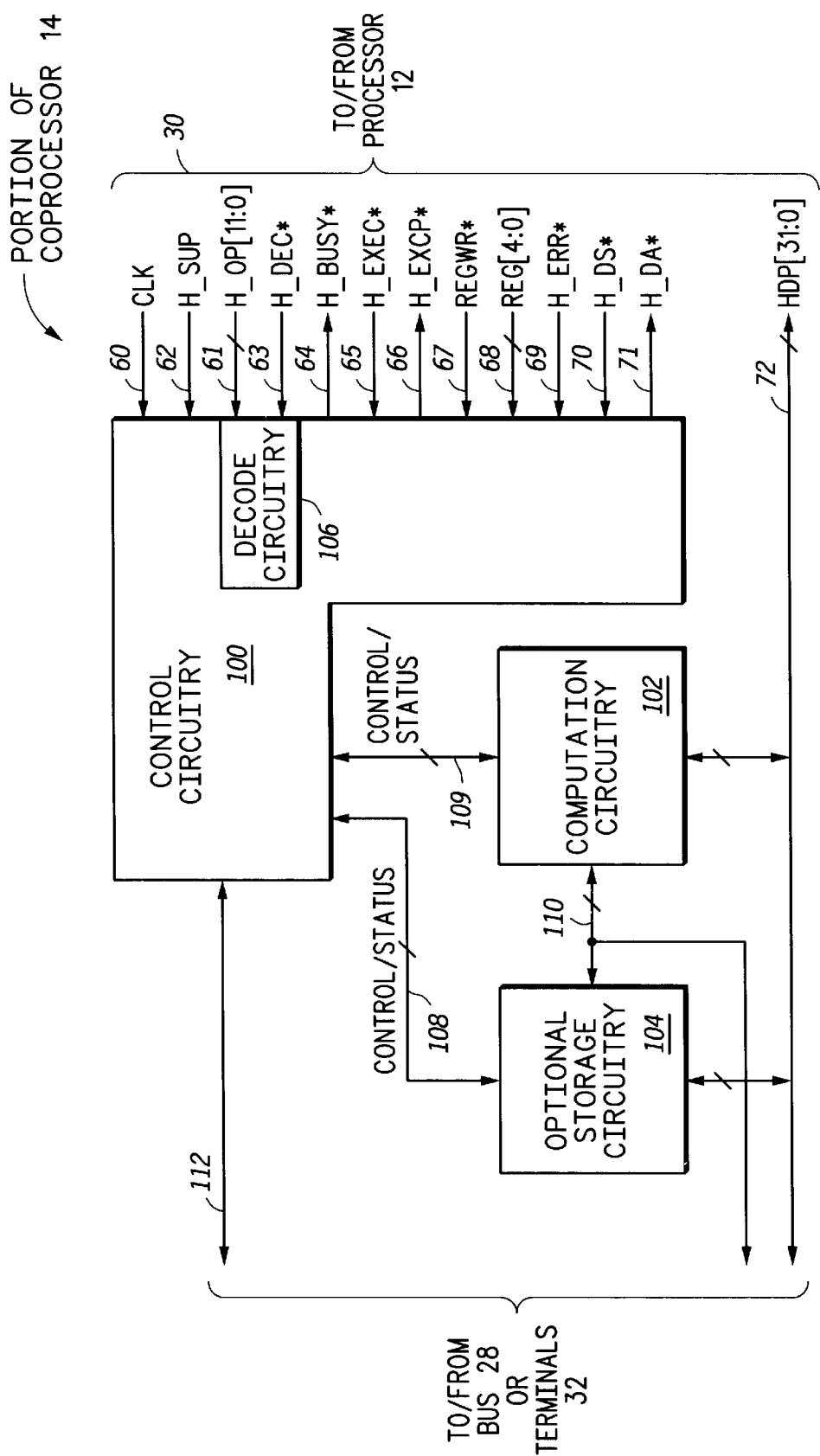
FIG. 3 is a block diagram that illustrates one embodiment of a portion of coprocessor of FIG. 1.

FIG. 3 is a block diagram that illustrates one embodiment of a portion of coprocessor 14. In one embodiment, coprocessor 14 includes control circuitry 100, computation circuitry 102 and optional storage circuitry 104. Control circuitry 100 is bidirectionally coupled to processor 12 by way of coprocessor interface 30 which includes signals 60-72. In one embodiment of the present invention control circuitry 100 includes decode circuitry 106 which receives the operation signals 61 and the decode signal 63 from processor 12. Control circuitry 100 provides control information and receives status information from optional storage circuitry 104 by way of conductors 108. Control circuitry 100 provides control information and receives status information from computation circuitry 102 by way of conductors 109. Computation circuitry 102 and optional storage circuitry 104 are bidirectionally coupled by way of conductors 110. One or more of signals 110 may be provided to or from bus 28 or integrated circuit terminals 32. Control circuitry 100 may receive or provide information to or from bus 28 or integrated circuit terminals 32 by way of conductors 112. Signals 72 may be bidirectionally coupled to computation circuitry 102 and optional storage circuitry 104. In addition, signals 72 may be bidirectionally coupled to bus 28 or integrated circuit terminals 32. In an alternate embodiment of the present invention, optional storage circuitry 104 may not be implemented. In embodiments of the present invention in which optional storage circuitry 104 is implemented, it may be implemented using registers, any type of memory, any type of storage circuit including latches or programmable logic arrays, etc. In alternate embodiments of the present invention, computation circuitry 102 may perform any type of logic or computational function.

The system provides support for task acceleration by an external coprocessor 14 (or hardware accelerator) which is optimized for specific application related operations. These external coprocessors 14, 16 may be as simple as a coprocessor 14 for performing a population count, or a more complicated function such as a DSP acceleration coprocessor 14 or coprocessor 14 capable of high speed multiply/accumulate operation.

Data is transferred between the processor 12 and a coprocessor 14 by one or more of several mechanisms as appropriate for a particular implementation. These can be divided into transfers to the coprocessor 14, and transfers from the coprocessor 14.

One of the mechanisms for transferring data to a coprocessor 14 is the Register Snooping mechanism, which involves no instruction primitive, but is a by-product of normal processor 12 operation. This involves reflecting updates to the processor's 12 general purpose registers ("GPR") 46 across the interface such that a coprocessor 14 could monitor updates to one or more processor 12 registers. This might be appropriate if a coprocessor 14 "overlays" a GPR 46 for an internal register or function. In this case, no explicit passing of parameters from the processor 12 to a coprocessor 14 would be required.

Instruction primitives are provided in the base processor 12 for explicit transfer of operands and instructions between external coprocessors 14, 16 and the processor 12 as well. A handshaking mechanism is provided to allow control over the rate of instruction and data transfer.

Note that coprocessor 14 functions are designed to be implementation specific units, thus the exact functionality of a given unit is free to be changed across different implementations, even though the same instruction mappings may be present.

Figure 4:
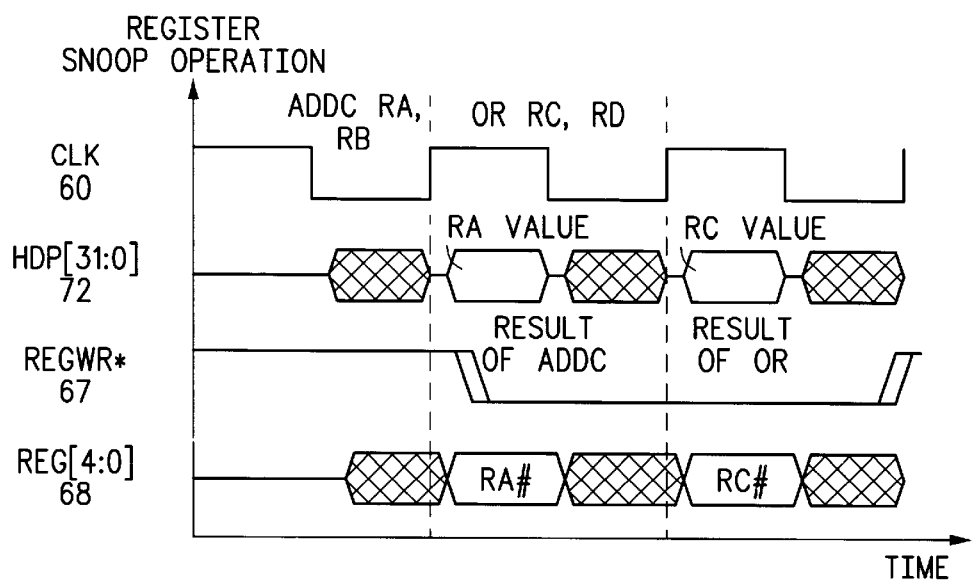
FIG. 4 is a timing diagram that illustrates a register snooping operation, in accordance with the present invention.

FIG. 4 is a timing diagram that illustrates a register snooping operation. To avoid the performance overhead of parameter passing to a coprocessor 14 or external monitor, a register snooping mechanism is provided. This allows a coprocessor 14 to implement a shadow copy of one or more of the processor's 12 general registers 46. The capability is implemented by transferring the value being written into one of the processor GPRs 46 and an indication of which register 46 is being updated for each GPR update. A strobe signal REGWR* 67 is asserted for each register update. The value is transferred across the 32-bit bi-directional data path HDP[31:0] 72, and a 5-bit register number bus provides a pointer to the actual processor register 46 being updated (REG[4:0]) 68. The register number may refer to a register 46 in a normal file or in an alternate file. In the preferred embodiment, alternate file registers are indicated by REG[4]==1, and normal file registers by REG[4]==0. However, note this invention does not depend in any way on the actual partitioning of the register set.

A coprocessor 14 may latch the value internally along with an indication of the destination register 46 number to avoid an explicit move later. This functionality may also be used by a debug coprocessor 14 to track the state of the register file 46 or a subset of it. FIG. 4 shows an example of the snooping capability.

A dedicated 12-bit instruction bus (H_OP[11:0]) 61 provides the coprocessor interface 30 opcode being issued to the external coprocessor 14. This bus reflects the low order 12 bits of the processor's opcode. The high-order four bits are not reflected as they are always 0b0100. A supervisor mode indicator (H_SUP) 62 is also provided to indicate the current state of the PSR(S) bit, indicating whether the processor is operating in supervisor or user mode. This can be useful for limiting certain coprocessor functions to supervisory mode. A set of handshake signals between the processor 12 and external coprocessors 14, 16 coordinate coprocessor interface 30 instruction execution.

The control signals generated by the processor 12 are a reflection of the internal pipeline structure of the processor 12. The processor pipeline 44 consists of stages for instruction fetch, instruction decode 42, execution, and result writeback. It contains one or more instruction registers (IR). The processor 12 also contains an instruction prefetch buffer to allow buffering of an instruction prior to the decode stage 42. Instructions proceed from this buffer to the instruction decode stage 42 by entering the instruction decode register IR.

The instruction decoder 42 receives inputs from the IR, and generates outputs based on the value held in the IR. These decode 42 outputs are not always valid, and may be discarded due to exception conditions or changes in instruction flow. Even when valid, instructions may be held in the IR until they can proceed to the execute stage of the instruction pipeline. Since this cannot occur until previous instructions have completed execution (which may take multiple clocks), the decoder will continue to decode the value contained in the IR until the IR is updated.

Figure 5:
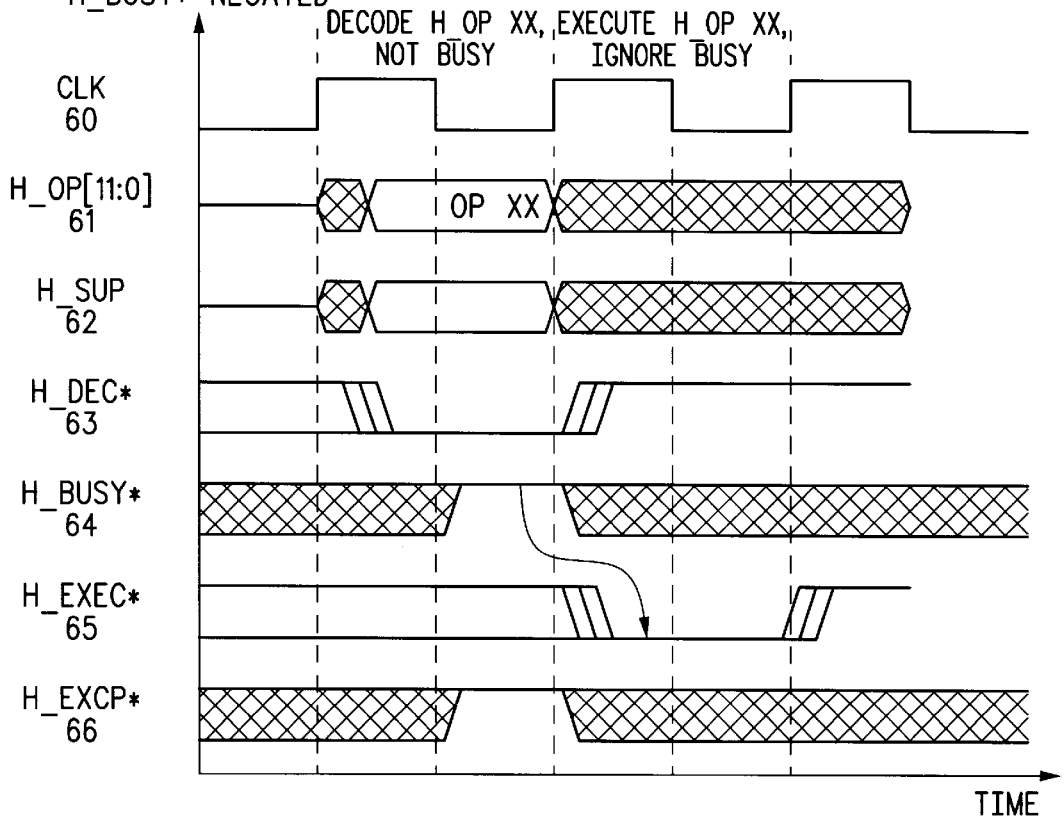
FIG. 5 is a timing diagram that illustrates the basic instruction interface operation for instruction handshaking.

FIG. 5 is a timing diagram that illustrates the basic instruction interface operation for instruction handshaking.

An instruction decode strobe (H_DEC*) signal 63 is provided to indicate the decode of a coprocessor interface 30 opcode by the processor 12. This signal will be asserted when a coprocessor interface 30 opcode resides in the IR, even if the instruction may be discarded without execution. The H_DEC* 63 output may remain asserted for multiple clocks for the same instruction until the instruction is actually issued or is discarded.

A busy signal (H_BUSY*) 64 is monitored by the processor 12 to determine if an external coprocessor 14 can accept the coprocessor interface 30 instruction, and partially controls when issuance of the instruction occurs. If the H_BUSY* 64 signal is negated while H_DEC* 63 is asserted, instruction execution will not be stalled by the interface, and the H_EXEC* 65 signal may assert as soon as instruction execution can proceed. If the H_BUSY* 64 signal is asserted when the processor 12 decodes a coprocessor interface 30 opcode (indicated by the assertion of H_DEC* 63), execution of the coprocessor interface 30 opcode will be forced to stall. Once the H_BUSY* 64 signal is negated, the processor 12 may issue the instruction by asserting H_EXEC* 65. If a coprocessor 14 is capable of buffering instructions, the H_BUSY* 64 signal may be used to assist filling of the buffer.

Figure 6:
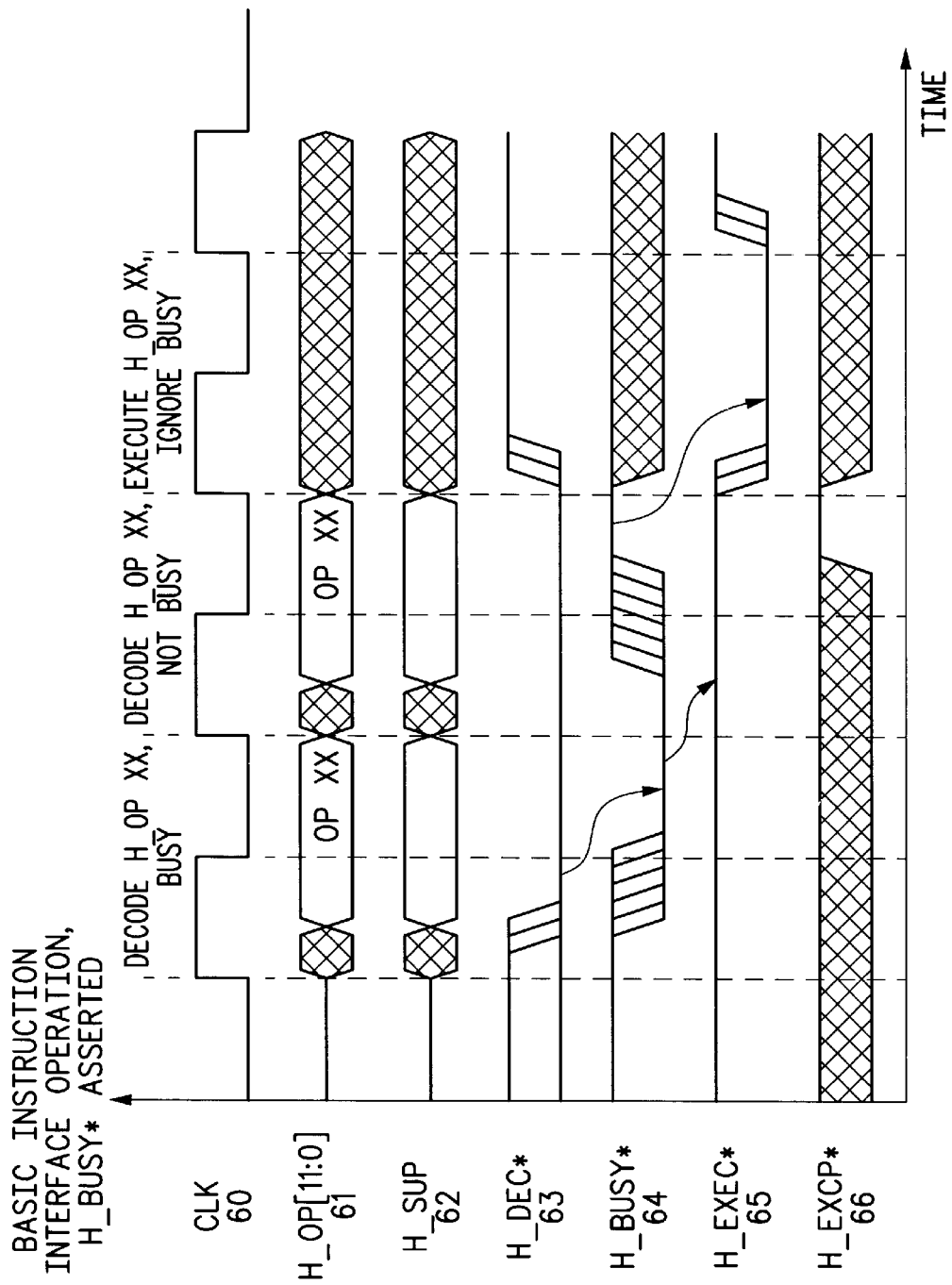
FIG. 6 is a timing diagram that illustrates the Instruction interface operation when the H_BUSY* signal is used to control coprocessor interface instruction execution.

FIG. 6 is a timing diagram that illustrates the Instruction interface operation when H_BUSY* 64 is used to control coprocessor interface 30 instruction execution. Once any internal stall condition has been resolved, and the H_BUSY* 64 signal has been negated, the processor can assert H_EXEC* 65 to indicate that the coprocessor interface 30 instruction has entered the execute stage of the pipeline. An external coprocessor 14 should monitor the H_EXEC* 65 signal to control actual execution of the instruction, since it is possible for the processor to discard the instruction prior to execution in certain circumstances. If execution of an earlier instruction results in an exception being taken, the H_EXEC* 65 signal will not be asserted, and the H_DEC* 63 output will be negated. A similar process can occur if the instruction in the IR is discarded as the result of a change in program flow.

Figure 7:
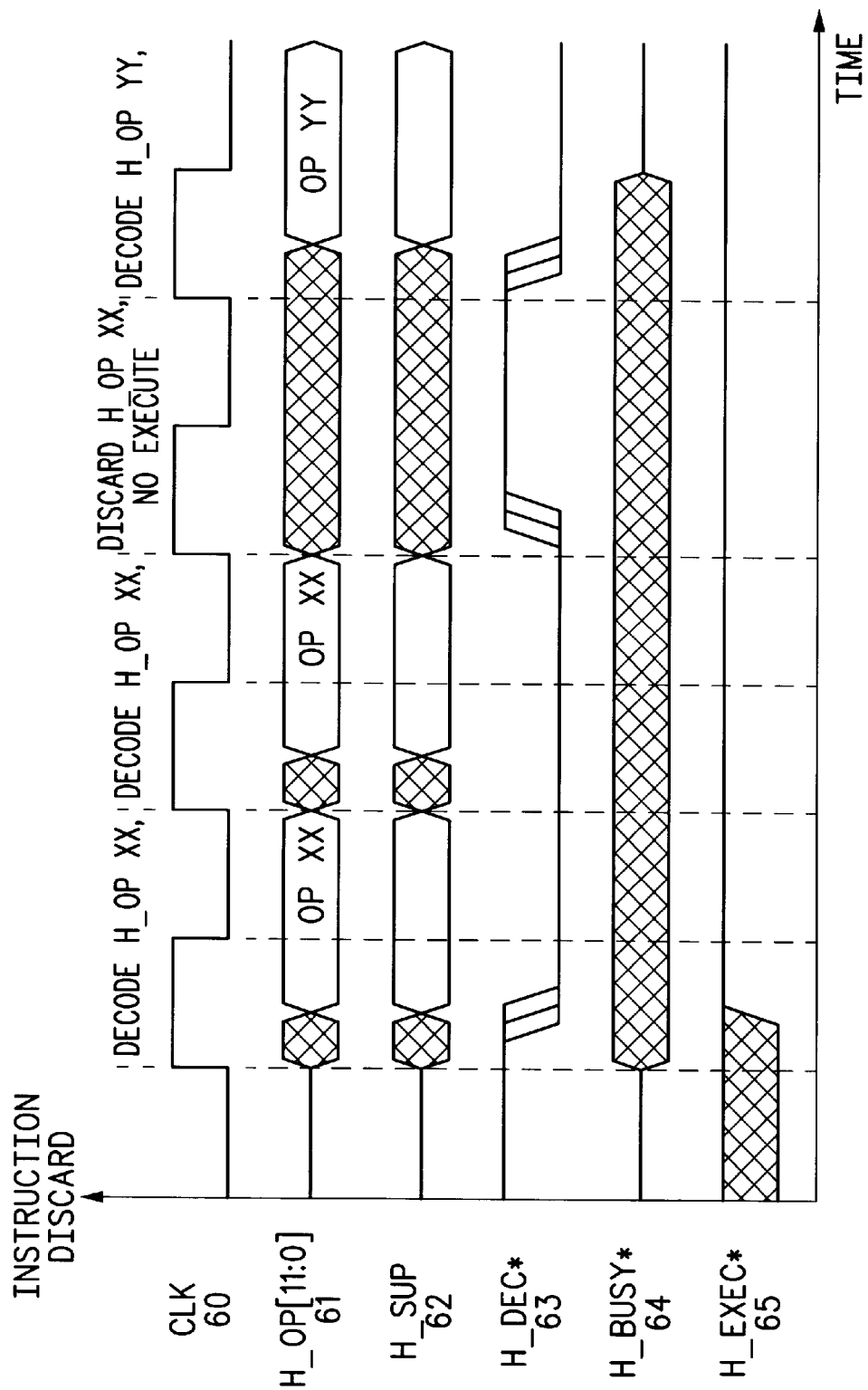
FIG. 7 is a timing diagram that illustrates instruction discard.

FIG. 7 is a timing diagram that illustrates instruction discard. If an instruction is discarded, the H_DEC* 63 signal will be negated before another coprocessor interface 30 opcode is placed on the H_OP[11:0] 61 bus.

Figure 8:
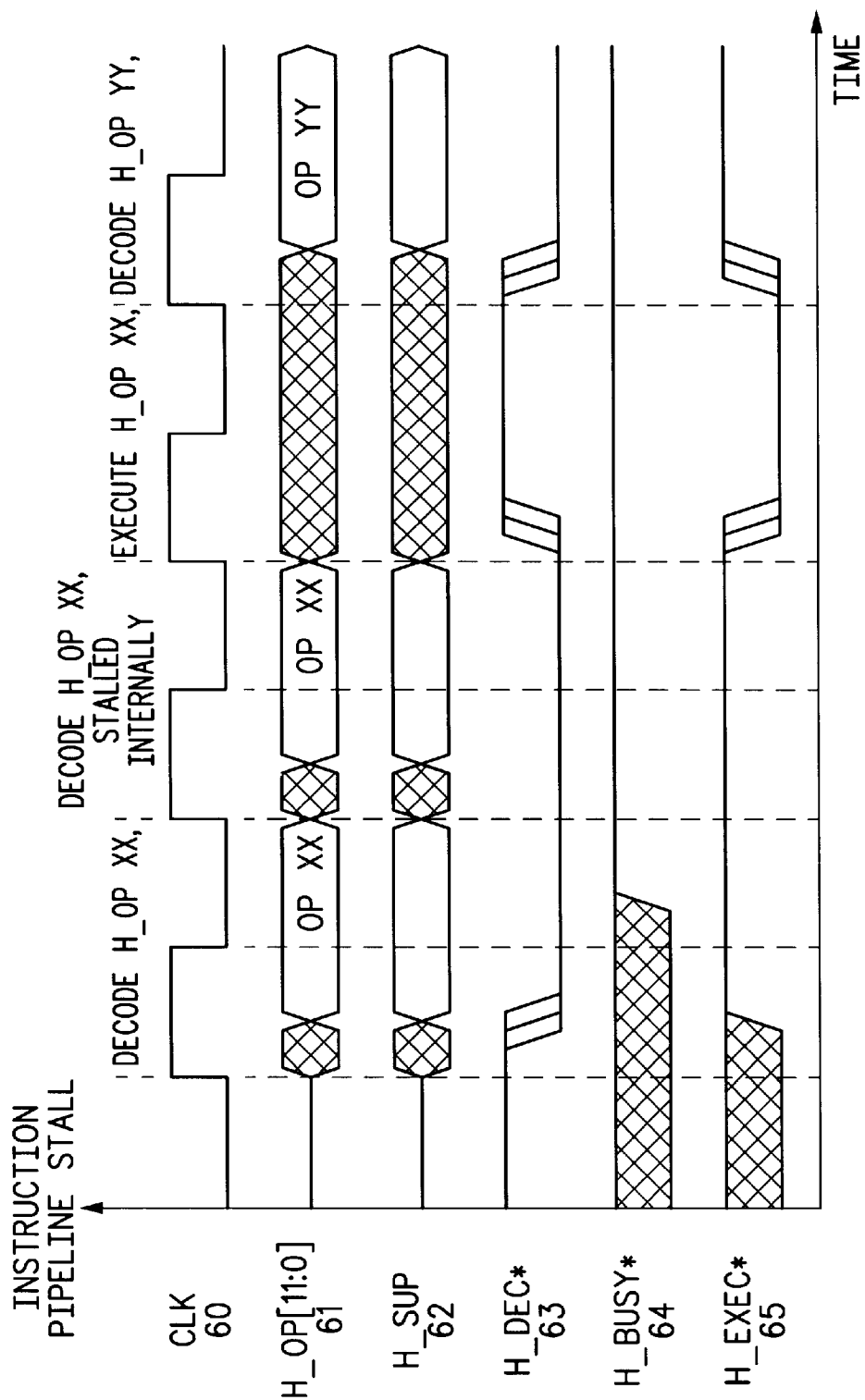
FIG. 8 is a timing diagram that illustrates an example of instruction pipeline stall.

FIG. 8 is a timing diagram that illustrates an example of instruction pipeline stall. There are circumstances where the processor 12 may delay the assertion of H_EXEC* 65 even though H_DEC* 63 is asserted and H_BUSY* 64 is negated. This can occur while waiting for an earlier instruction to complete.

Figure 9:
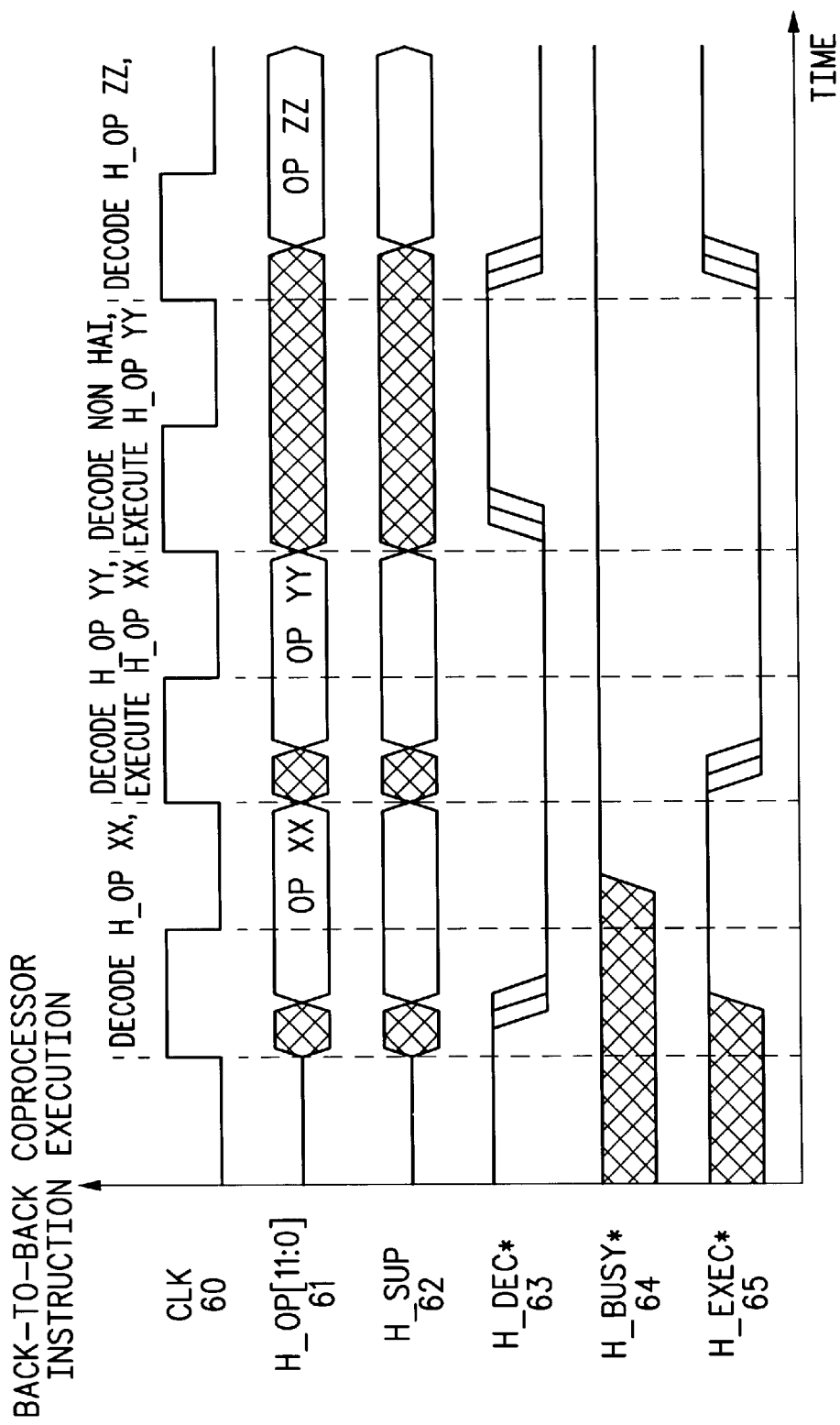
FIG. 9 is a timing diagram that illustrates an example of back-to-back execution with no stalls.

FIG. 9 is a timing diagram that illustrates an example of back-to-back execution with no stalls. For back-to-back coprocessor interface 30 instructions, the H_DEC* 63 signal can remain asserted without negation, even though the H_OP[11:0] 61 bus is updated as new instructions enter the IR. In general, the assertion of H_EXEC* 65 corresponds to execution of the instruction being decoded on the previous clock.

Figure 10:
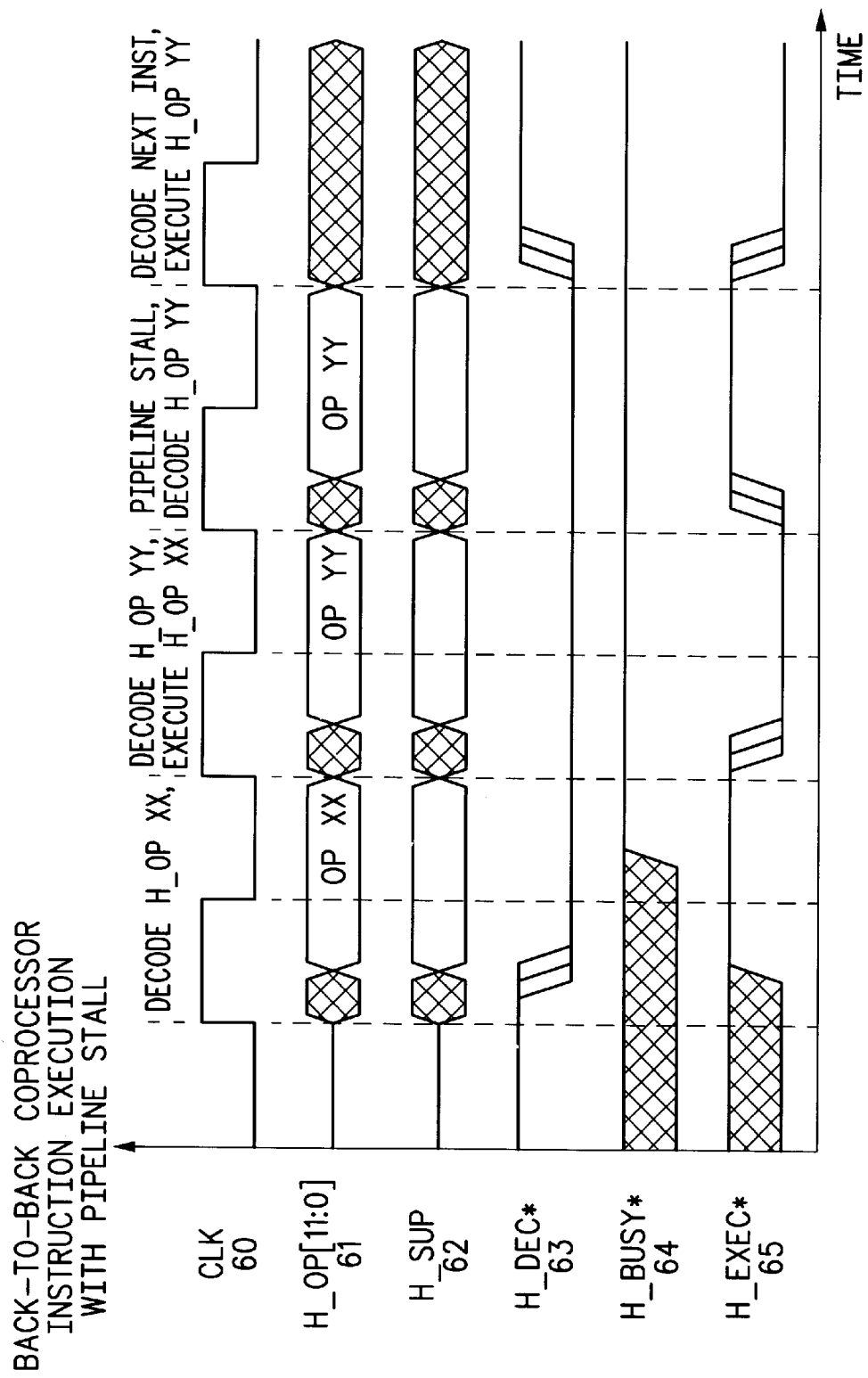
FIG. 10 is a timing diagram that illustrates back-to-back operation with internal pipeline stalls.

FIG. 10 is a timing diagram that illustrates back-to-back operation with internal pipeline stalls. In this case, H_BUSY* 64 is negated, but the processor does not assert H_EXEC* 65 for the second coprocessor interface 30 instruction until the internal stall condition disappears.

Figure 11:
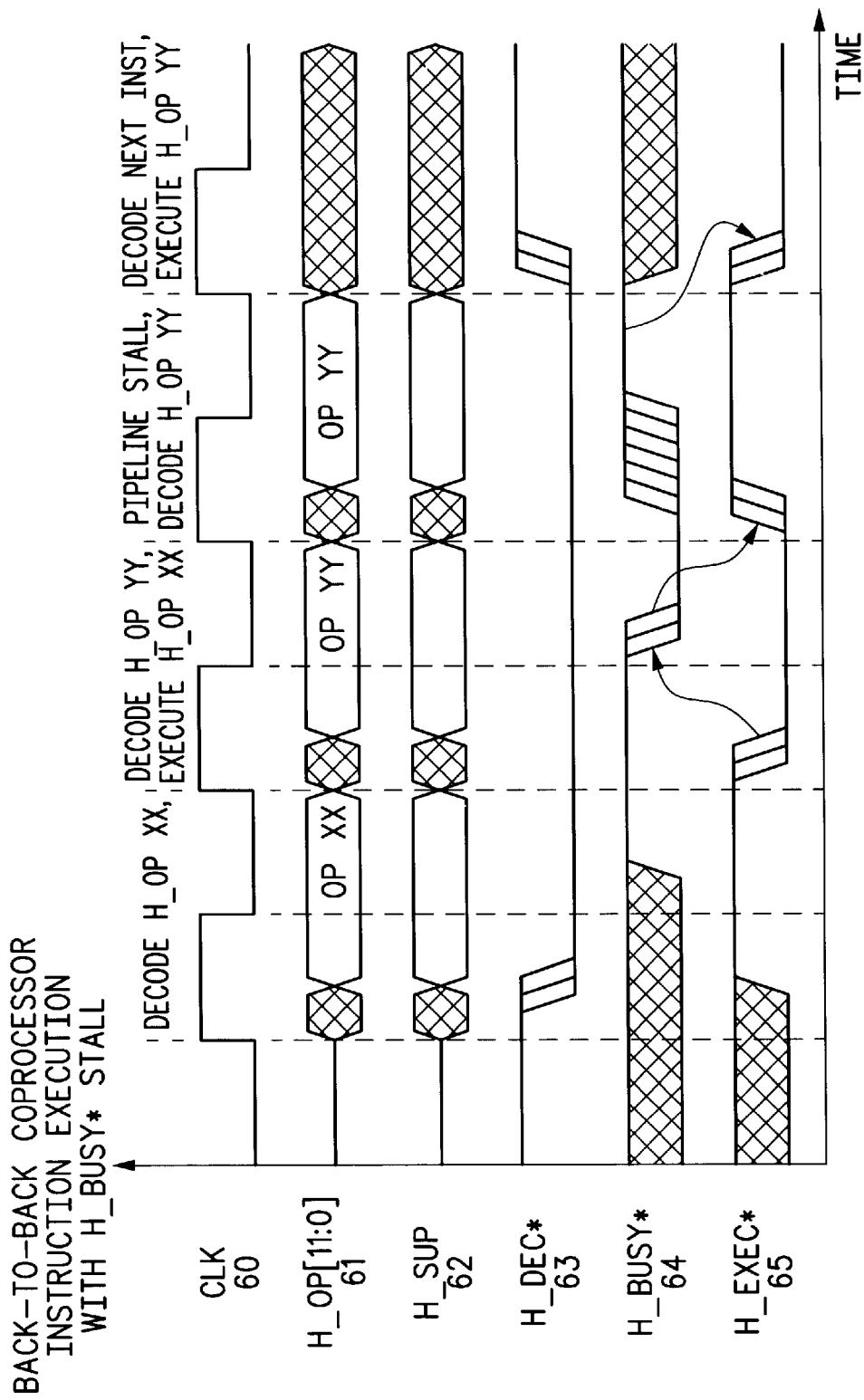
FIG. 11 is a timing diagram that illustrates back-to-back coprocessor interface 30 instructions with H_BUSY* stalls.

FIG. 11 is a timing diagram that illustrates back-to-back coprocessor interface 30 instructions with H_BUSY* 64 stalls. In this example, the external coprocessor 14 is busy, and cannot accept the second instruction immediately. H_BUSY* 64 asserts to prevent the second instruction from being issued by the processor 12. Once the coprocessor 14 becomes free, H_BUSY* 64 is negated, and the next coprocessor interface 30 instruction advances to the execute stage.

Exceptions related to the decode of a coprocessor interface 30 opcode may be signaled by an external coprocessor 14 with the H_EXCP* 66 signal. This input to the processor 12 is sampled during the clock cycle that H_DEC* 63 is asserted and H_BUSY* 64 is negated, and will result in exception processing for a Hardware Coprocessor 14 Exception if the coprocessor interface 30 opcode is not discarded as previously described. Details of this exception processing are described below.

Figure 12:
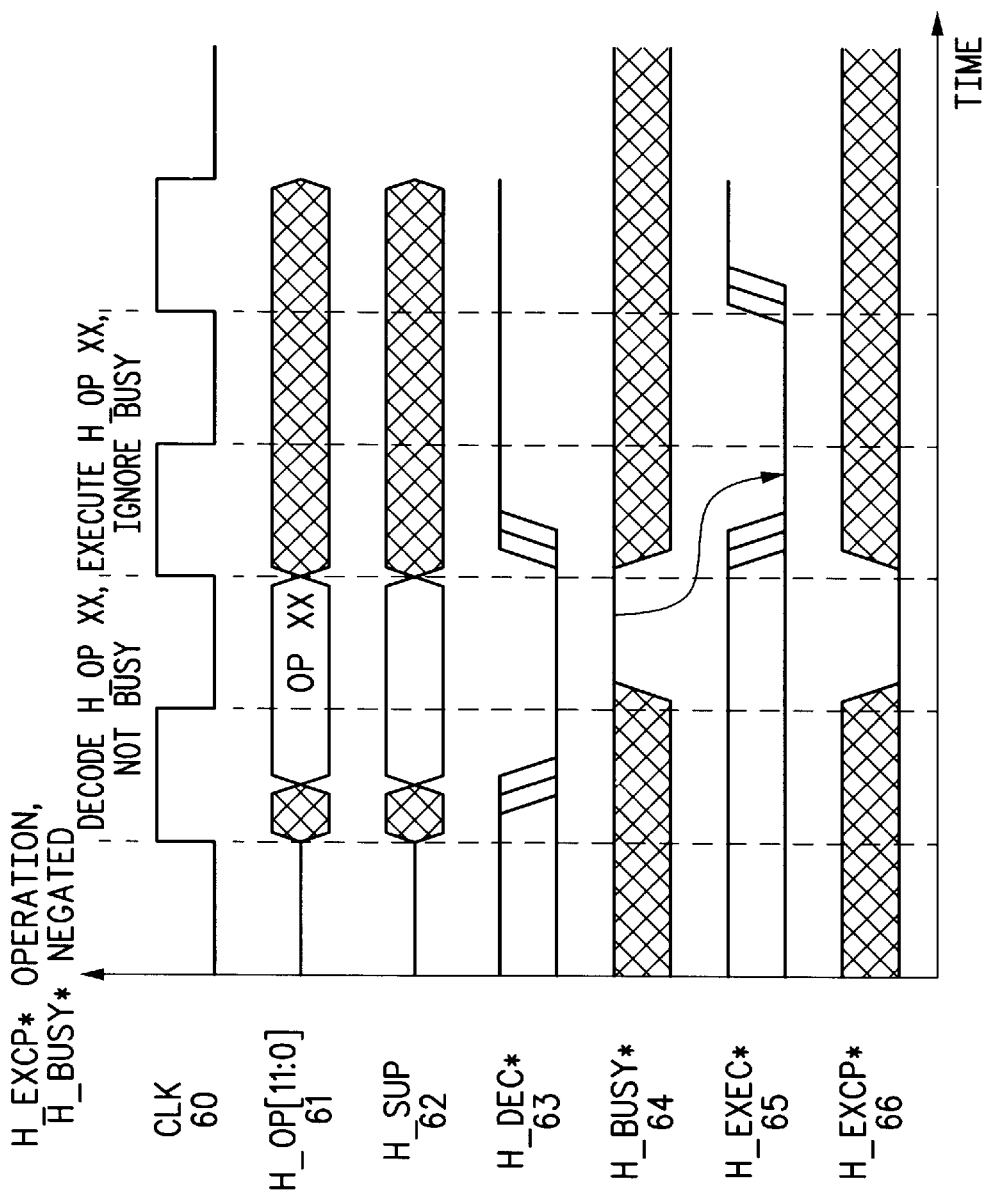
FIG. 12 is a timing diagram that illustrates an example of the H_EXCP* signal being asserted by a coprocessor in response to the decode and attempted execution of a coprocessor interface opcode.

FIG. 12 is a timing diagram that illustrates an example of the H_EXCP* 66 signal being asserted by a coprocessor 14 in response to the decode and attempted execution of a coprocessor interface 30 opcode. The H_EXCP* 66 signal is sampled by the processor 12 during the clock that H_DEC* 63 is asserted and H_BUSY* 64 is negated. The H_EXEC* 65 signal is asserted regardless of whether an exception is signaled by the interface; this assertion distinguishes the exception taken case from the instruction discard case.

Note that the exception corresponds to the instruction being decoded the previous clock cycle, and that no actual execution should take place. A coprocessor 14 must accept the offending instruction and signal an exception prior to the execute stage of the processor pipeline for it to be recognized. The H_EXCP* 66 signal is ignored for all clock cycles where H_DEC* 63 is negated or H_BUSY* 64 is asserted.

Figure 13:
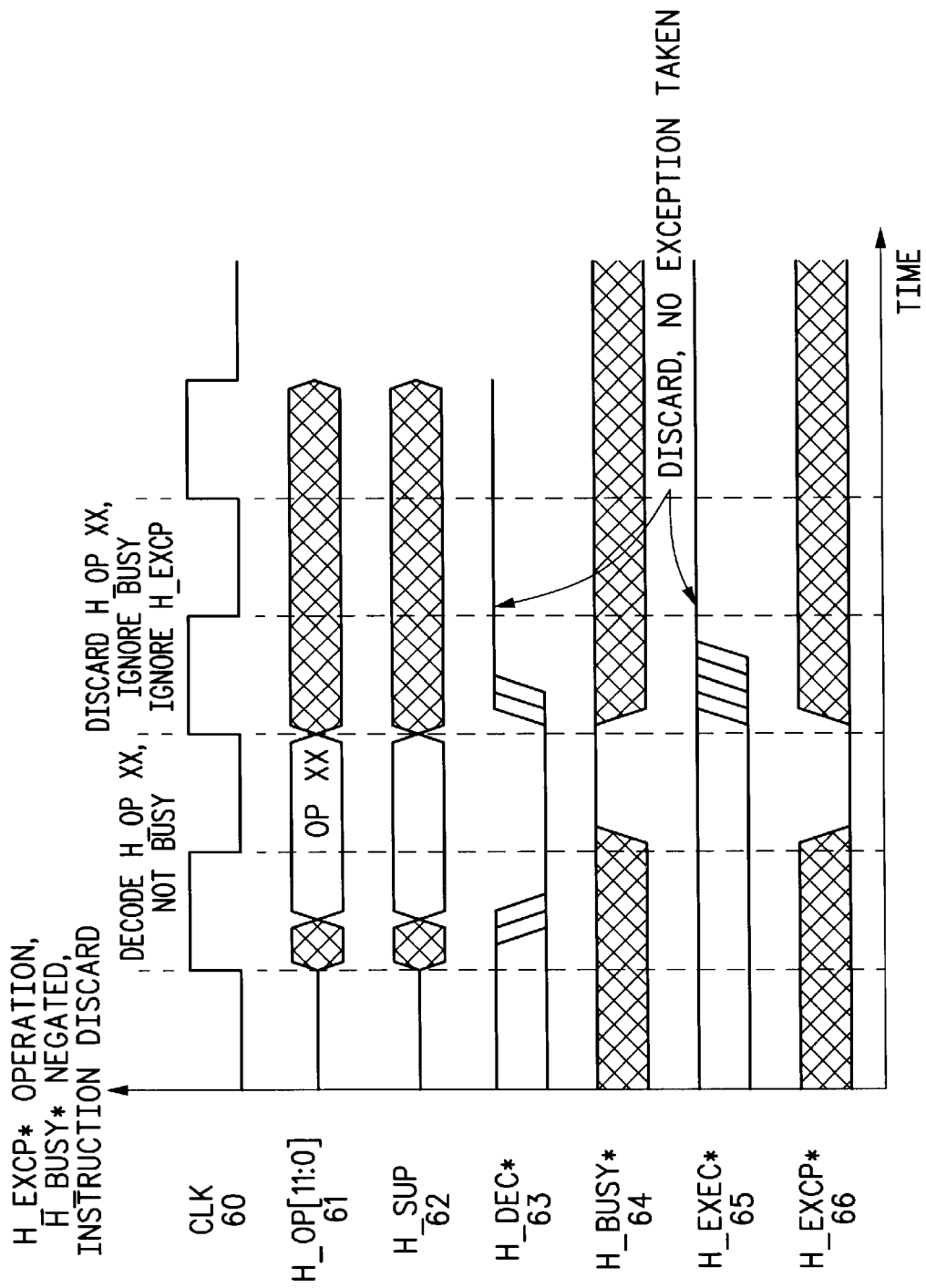
FIG. 13 is a timing diagram that illustrates an example of the H_EXCP* signal being asserted by a coprocessor in response to the decode and attempted execution of a coprocessor interface opcode when the coprocessor interface instruction is discarded.

FIG. 13 is a timing diagram that illustrates an example of the H_EXCP* 66 signal being asserted by a coprocessor 14 in response to the decode and attempted execution of a coprocessor interface 30 opcode. Contrasting this with the timing diagram in FIG. 14, in this example, the coprocessor interface 30 instruction is discarded, so the H_EXEC* 65 signal is not asserted, and the H_DEC* 63 is negated.

Figure 14:
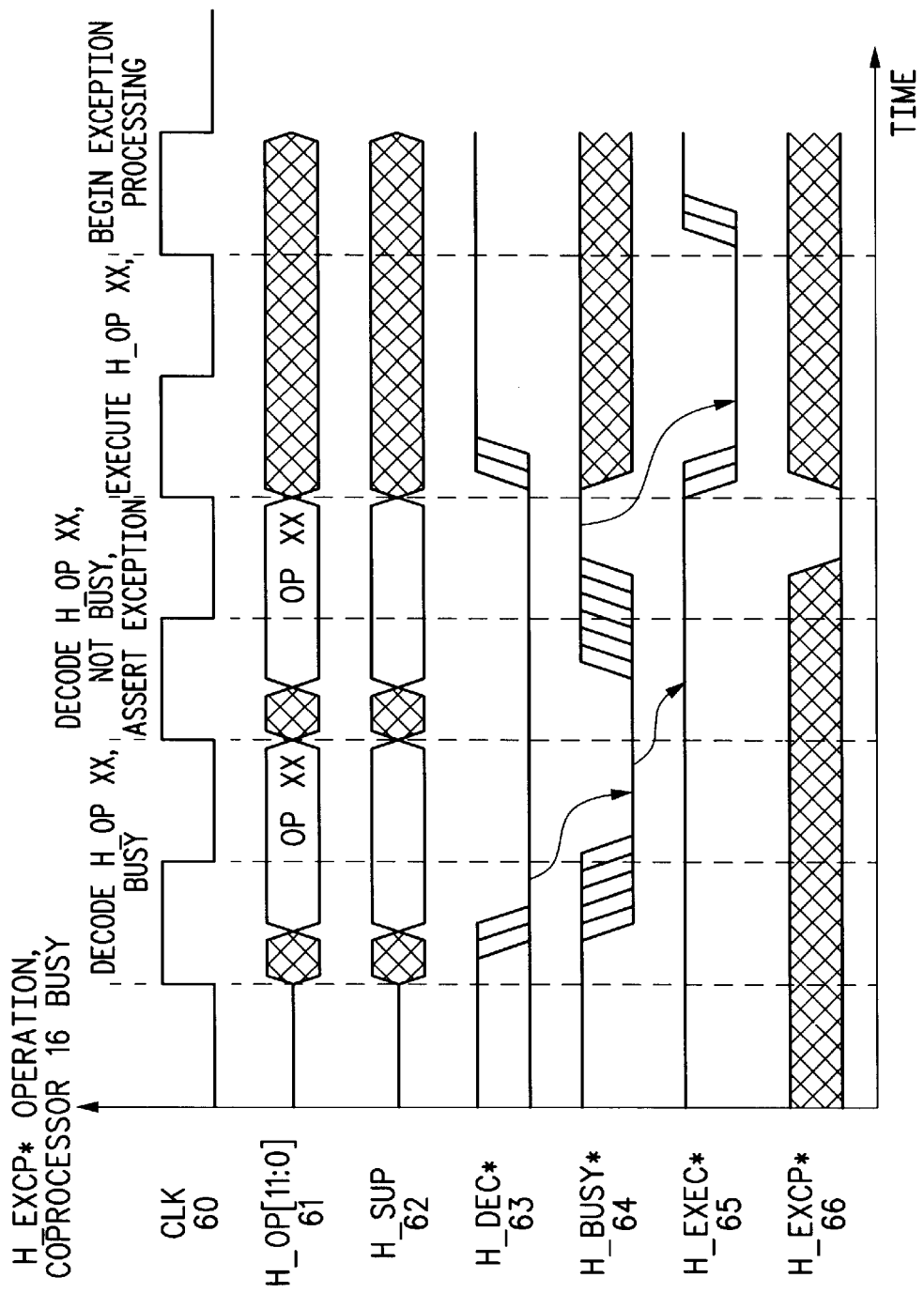
FIG. 14 is a timing diagram that illustrates an example where H_BUSY* has been asserted to delay the execution of an coprocessor interface opcode.

FIG. 14 is a timing diagram that illustrates an example where H_BUSY* 64 has been asserted to delay the execution of a coprocessor interface 30 opcode which will result in an exception.

The H_BUSY* 64 and H_EXCP* 66 signals are shared by all coprocessors 14, 16, thus they must be driven in a coordinated manner. These signals should be driven (either high or low, whichever is appropriate) by the coprocessor 14, 16 corresponding to H_OP[11:10] 61 on clock cycles where H_DEC* 63 is asserted. By driving the output only during the low portion of the clock, these signals may be shared by multiple coprocessors 14, 16 without contention. A holding latch internal to the processor 12 is provided on this input to hold it in a valid state for the high phase of the clock while no unit is driving it.

Some of the coprocessor interface 30 instruction primitives also imply a transfer of data items between the processor 12 and an external coprocessor 14. Operands may be transferred across the coprocessor interface 30 as a function of the particular primitive being executed. Provisions are made for transferring one or more of the processor 12 GPRs either to or from coprocessor 14 across a 32-bit bi-directional data path. In addition, provisions are also made to load or store a single data item from/to memory 18 with the data sink/source being the coprocessor interface 30. The processor 12 will pass parameters to external coprocessors 14, 16 via the HDP[31:0] 72 bus during the high portion of CLK 60, operands are received and latched from the coprocessor interface 30 by the processor 12 during the low phase of the clock. A delay is provided as the clock transitions high before drive occurs to allow for a small period of bus hand-off. A coprocessor 14 interface must provide the same small delay at the falling clock edge. Handshaking of data items is supported with the Data Strobe (H_DS* 70) output, the Data Acknowledge (H_DA* 71) input, and the Data Error (H_ERR* 69) output signals.

The processor 12 provides the capability of transferring a list of call or return parameters to the coprocessor interface 30 in much the same way as software subroutines are called or returned from. A count of arguments is indicated in the H_CALL or H_RET primitive to control the number of parameters passed. Register values beginning with the content of processor 12 register R4 are transferred to (from) the external coprocessor 14 as part of the execution of the H_CALL (H_RET) primitive. Up to seven register parameters may be passed. This convention is similar to the software subroutine calling convention.

Handshaking of the operand transfers are controlled by the Data Strobe (H_DS* 70) output and Data Acknowledge (H_DA* 71) input signals. Data Strobe will be asserted by the processor 12 for the duration of the transfers, and transfers will occur in an overlapped manner, much the same as the processor 12 interface operation. Data Acknowledge (H_DA*) 71 is used to indicate that a data element has been accepted or driven by a coprocessor 14.

Figure 15:
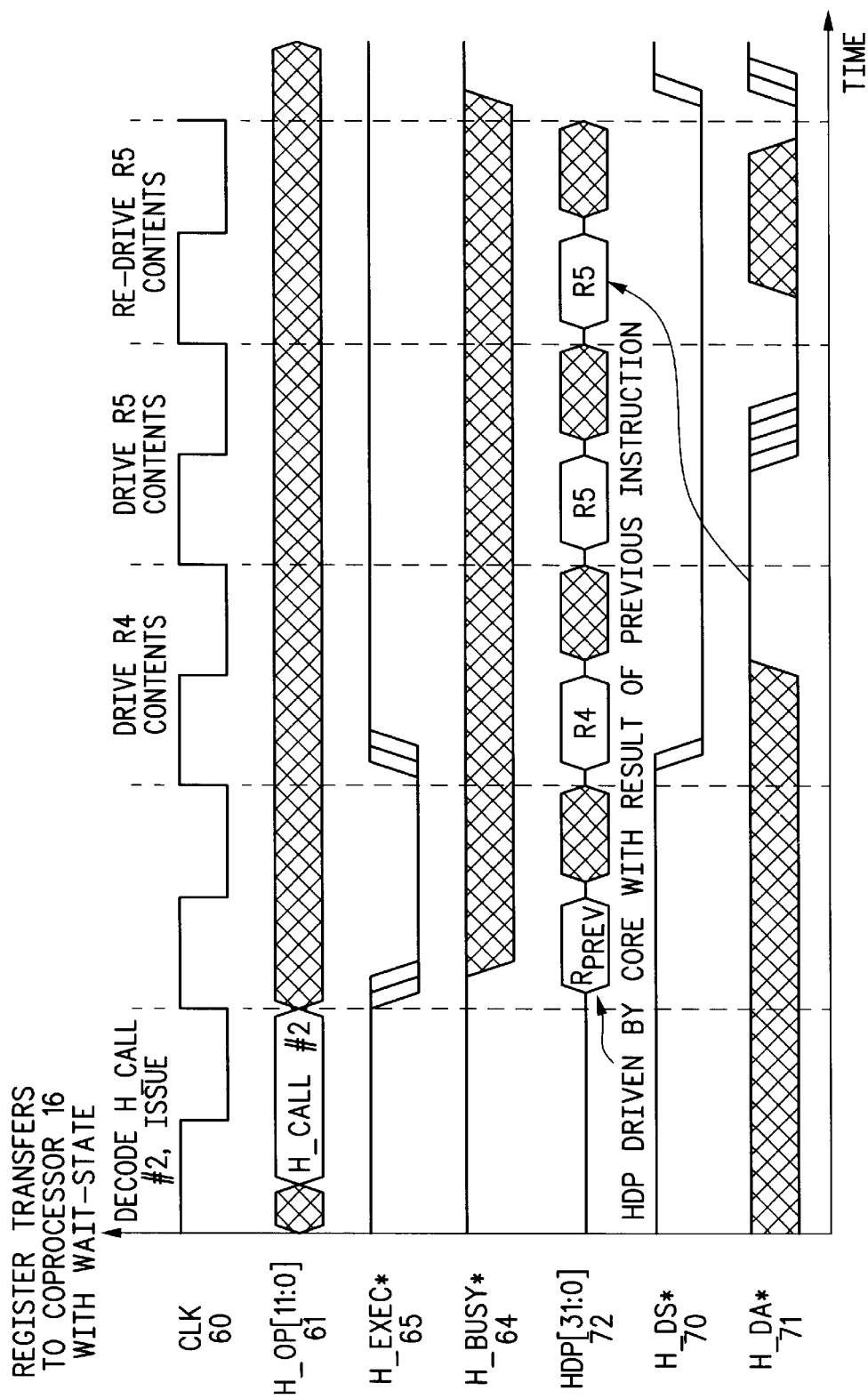
FIG. 15 is a timing diagram that illustrates an example of register transfers associated with the H_CALL primitive.

FIG. 15 is a timing diagram that illustrates an example of register 46 transfers associated with the H_CALL primitive. Instruction primitives are provided to transfer multiple processor registers and the transfers can ideally occur every clock. For transfers to an external coprocessor 14, the processor will automatically begin driving the next operand (if needed) prior to (or concurrent with) the acknowledge of the current item. External logic must be capable of one level of buffering to ensure no loss of data. This FIG. shows the sequencing of an H_CALL transfer to the coprocessor interface 30, where two registers are to be transferred. The second transfer is repeated due to a negated Data Acknowledge (H_DA*) 71.

For transfers from an external coprocessor 14 to processor registers 46, the processor 12 is capable of accepting values from an external coprocessor 14 every clock cycle after H_DS* 70 has been asserted, and these values are written into the register file 46 as they are received, so no buffering is required.

Figure 16:
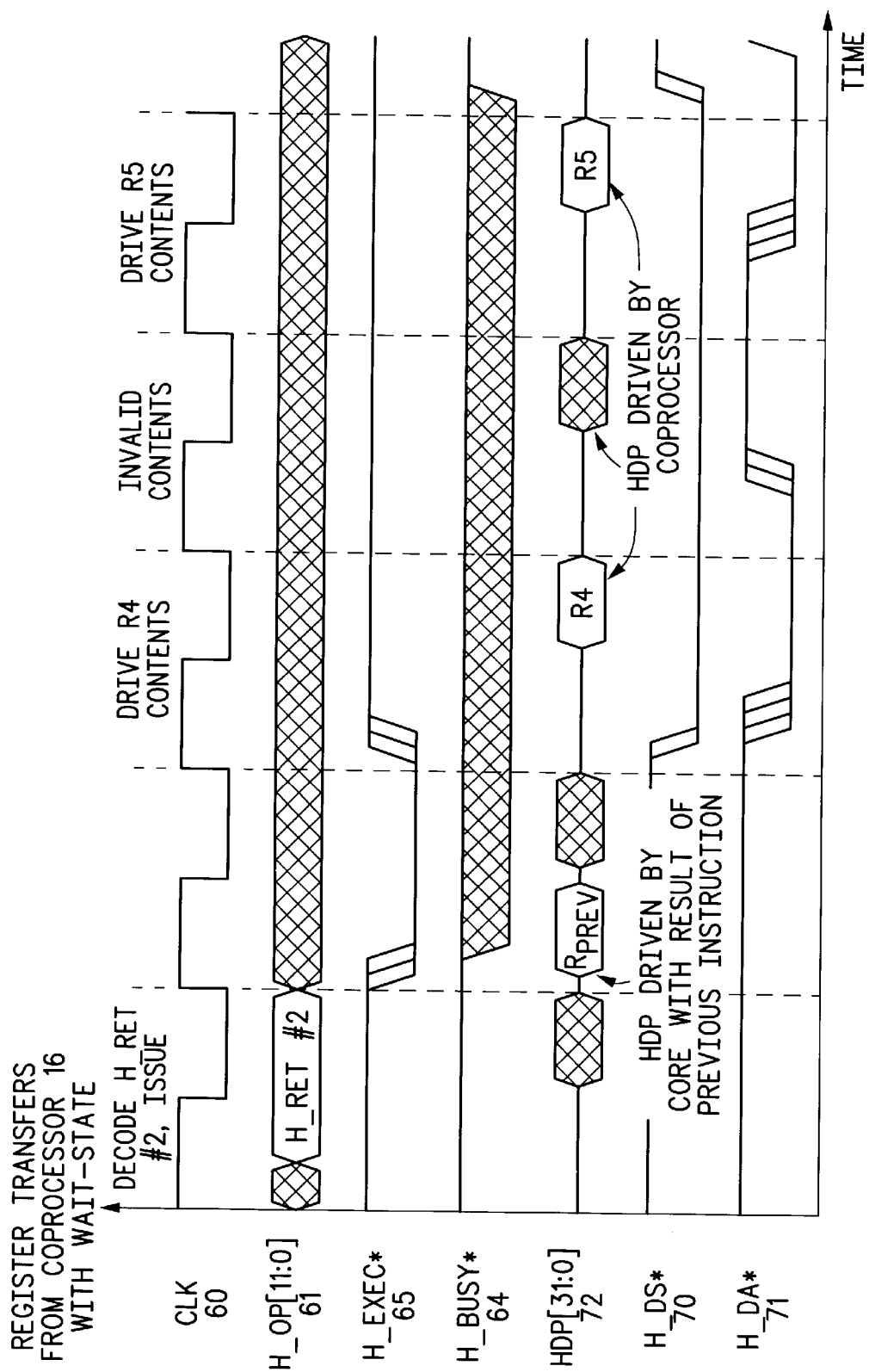
FIG. 16 is a timing diagram that illustrates an example of register transfers associated with the H_RET primitive.

FIG. 16 is a timing diagram that illustrates an example of register 46 transfers associated with the H_RET primitive. In this example, two register 46 values are transferred. The coprocessor 14 may drive data beginning with the clock following the assertion of the H_EXEC* 65 signal, as this is the clock where H_DS* 70 will first be asserted. The H_DS* 70 output transitions with the rising edge of CLK 60, while the H_DA* 71 input is sampled during the low phase of CLK 60.

The processor 12 provides the capability of transferring a single memory operand to or from the coprocessor interface 30 with the H_LD or H_ST instruction primitives.

The H_LD primitive is used to transfer data from memory 18 to a coprocessor 14. Handshaking of the operand transfer to the coprocessor 14 is controlled by the Data Strobe (H_DS*) 70 signal. Data Strobe will be asserted by the processor 12 to indicate that a valid operand has been placed on the HDP[31:0] 72 bus. The Data Acknowledge (H_DA*) 71 input is ignored for this transfer.

Figure 17:
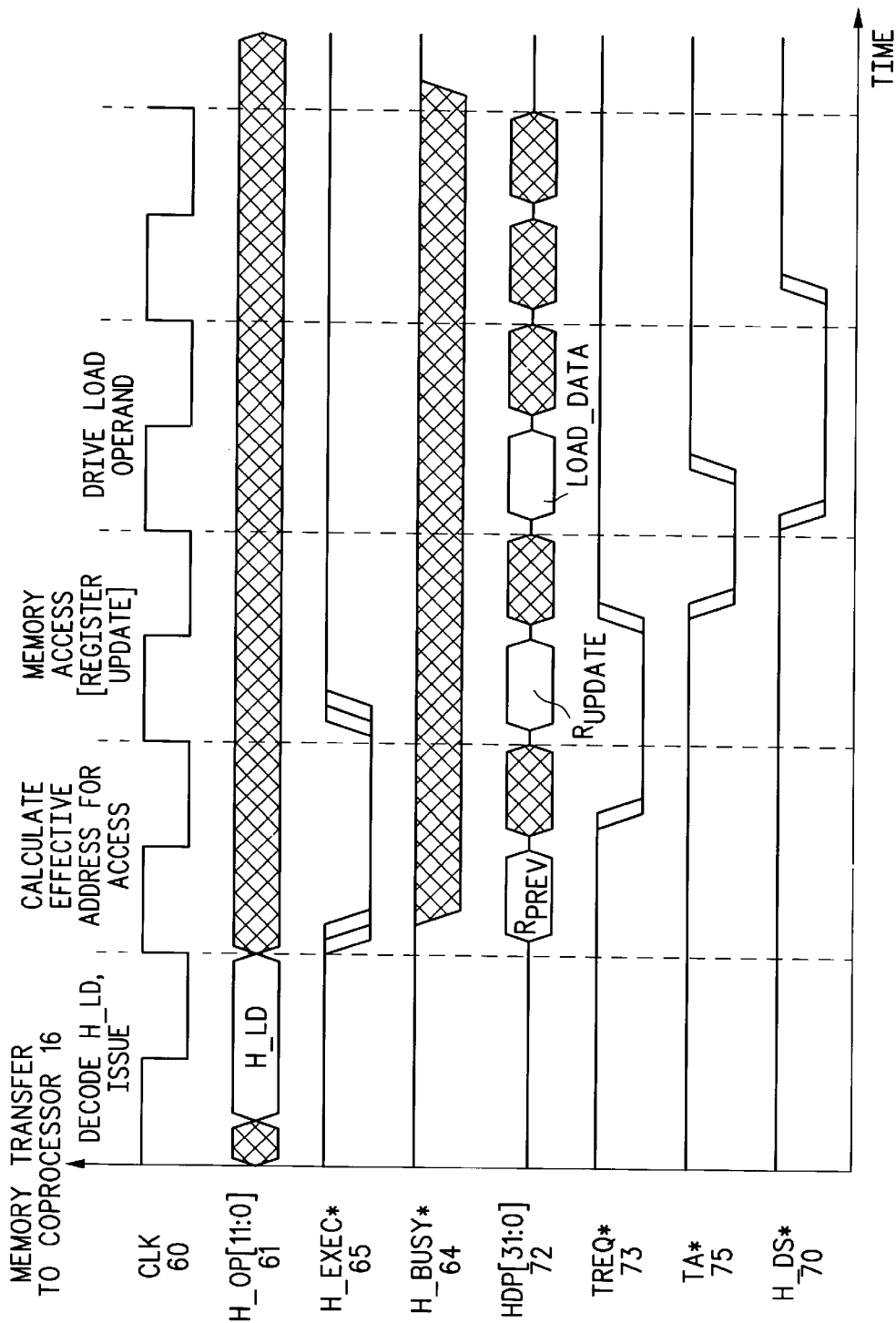
FIG. 17 is a timing diagram that illustrates the sequencing of an H_LD transfer to the coprocessor interface

FIG. 17 is a timing diagram that illustrates the sequencing of an H_LD transfer to the coprocessor interface 30. In this case, there is a no-wait state memory 18 access. For memory 18 accesses with n wait-states, the operand and H_DS* 70 would be driven n clocks later. If the option to update the base register 46 with the effective address of the load is selected, the update value is driven on HDP[31:0] 72 the first clock after it has been calculated (the clock following the assertion of H_EXEC* 65).

Figure 18:
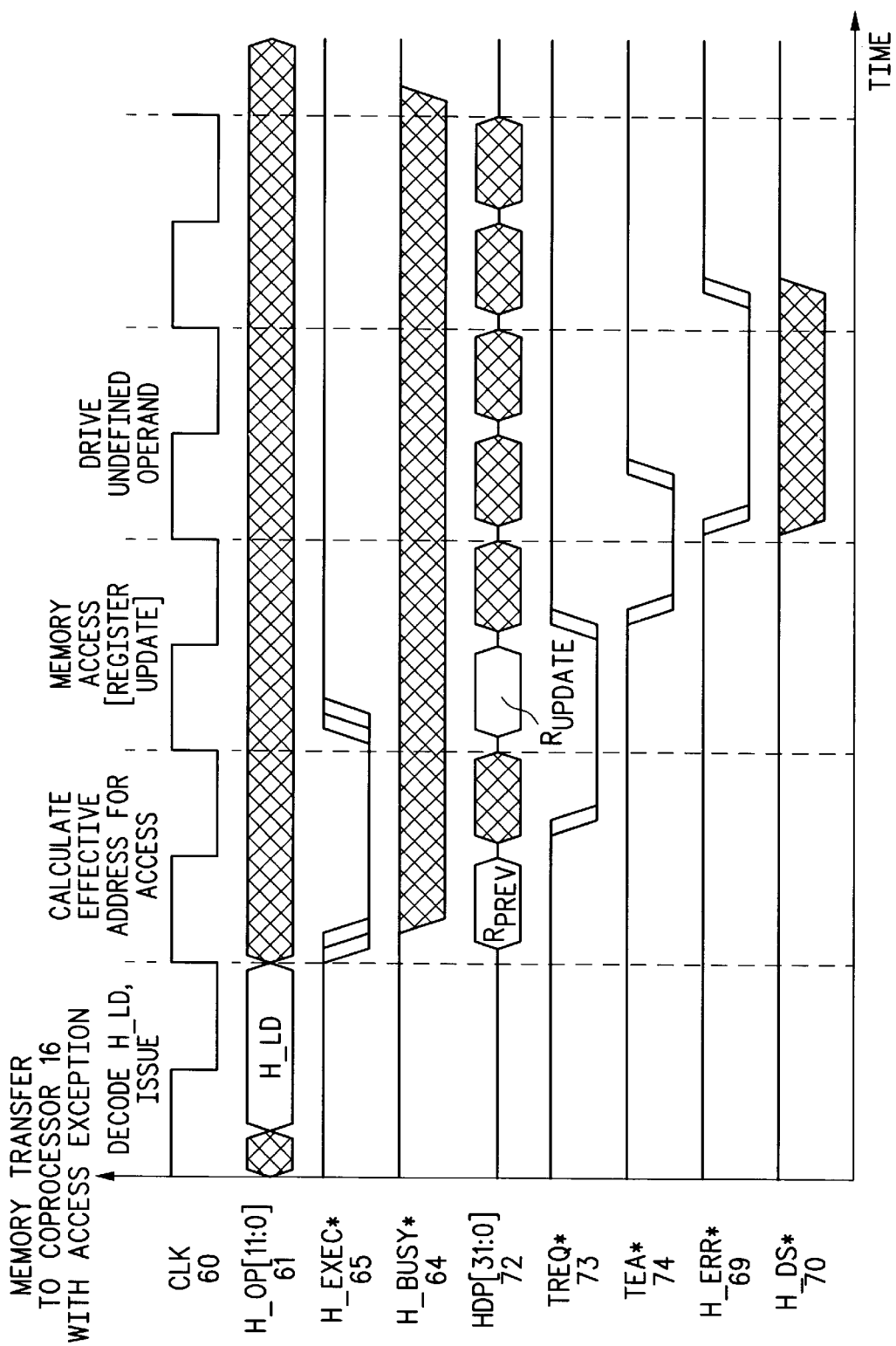
FIG. 18 is a timing diagram that illustrates the protocol when a memory access results in an access exception.

FIG. 18 is a timing diagram that illustrates the protocol when a memory 18 access results in an access exception. In such a case, the H_ERR* 69 signal is asserted back to the external coprocessor 14.

The H_ST primitive can be used to transfer data to memory 18 from a coprocessor 14. If the option to update the base register 46 with the effective address of the store is selected, the update value is driven on HDP[31:0] 72 the first clock after it has been calculated (the clock following the assertion of H_EXEC* 65).

Figure 19:
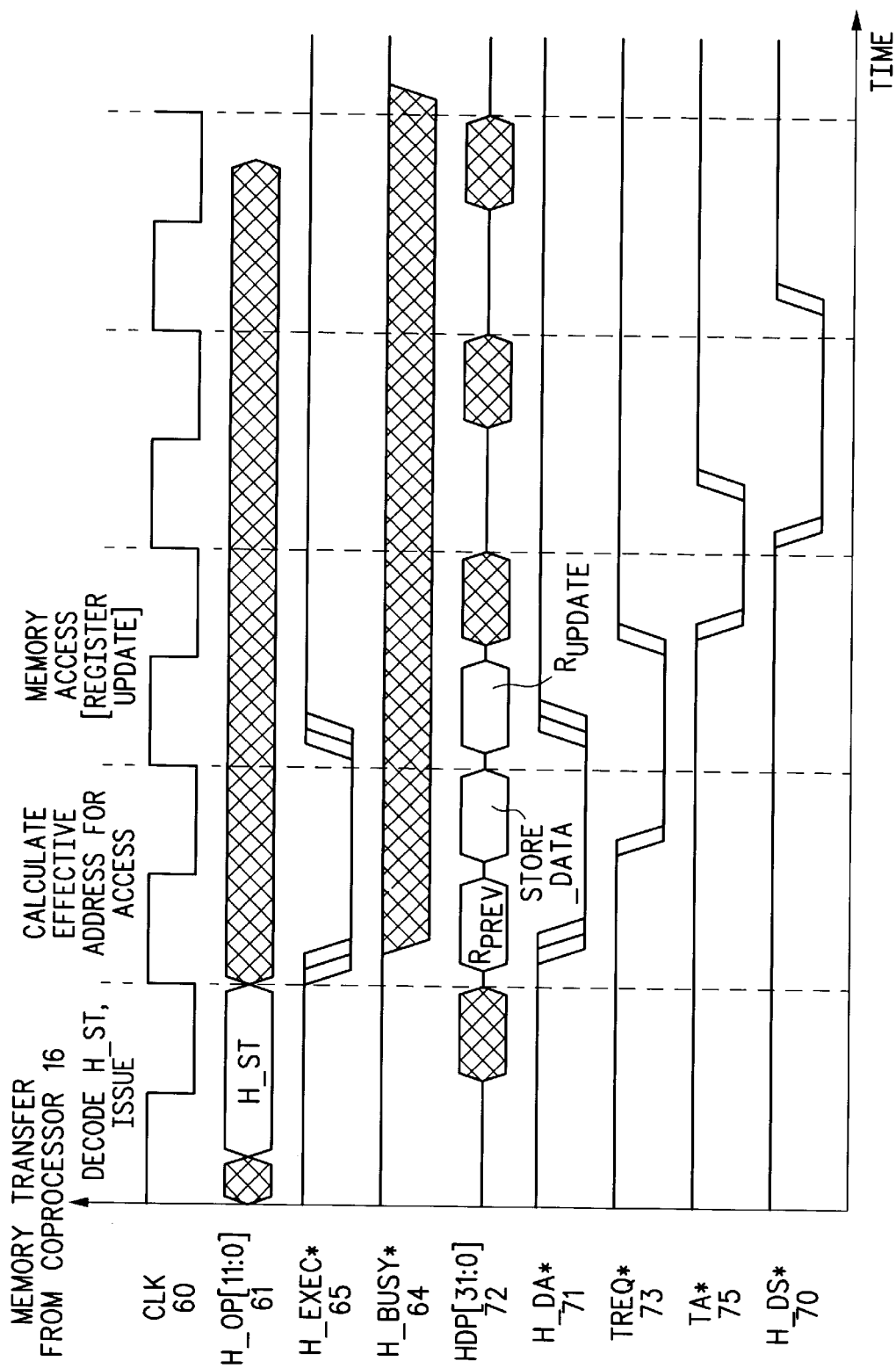
FIG. 19 is a timing diagram that illustrates an example of a transfer associated with the H_ST primitive.

FIG. 19 is a timing diagram that illustrates an example of a transfer associated with the H_ST primitive. The handshake associated with the H_ST primitive consists of two parts, an initial handshake from the coprocessor 14, which must provide data for the store, and a completion handshake from the processor 12 once the store to memory 18 has completed.

The initial handshake uses the H_DA* 71 input to the processor 12 to signal that the coprocessor 14 has driven store data to the processor 12. The H_DA* 71 signal is asserted the same clock that data is driven onto the HDP[31:0] 72 bus by the coprocessor 14. The store data is taken from the lower half of the bus for a halfword sized store, the upper 16 bits will not be written into memory 18. The H_DA* 71 signal will be sampled beginning with the clock surface the H_EXEC* 65 signal is asserted. The memory cycle is requested during the clock where H_DA* 71 is recognized, and store data will be driven to memory 18 on the following clock. Once the store has completed, the processor 12 will assert the H_DS* 70 signal.

Figure 20:
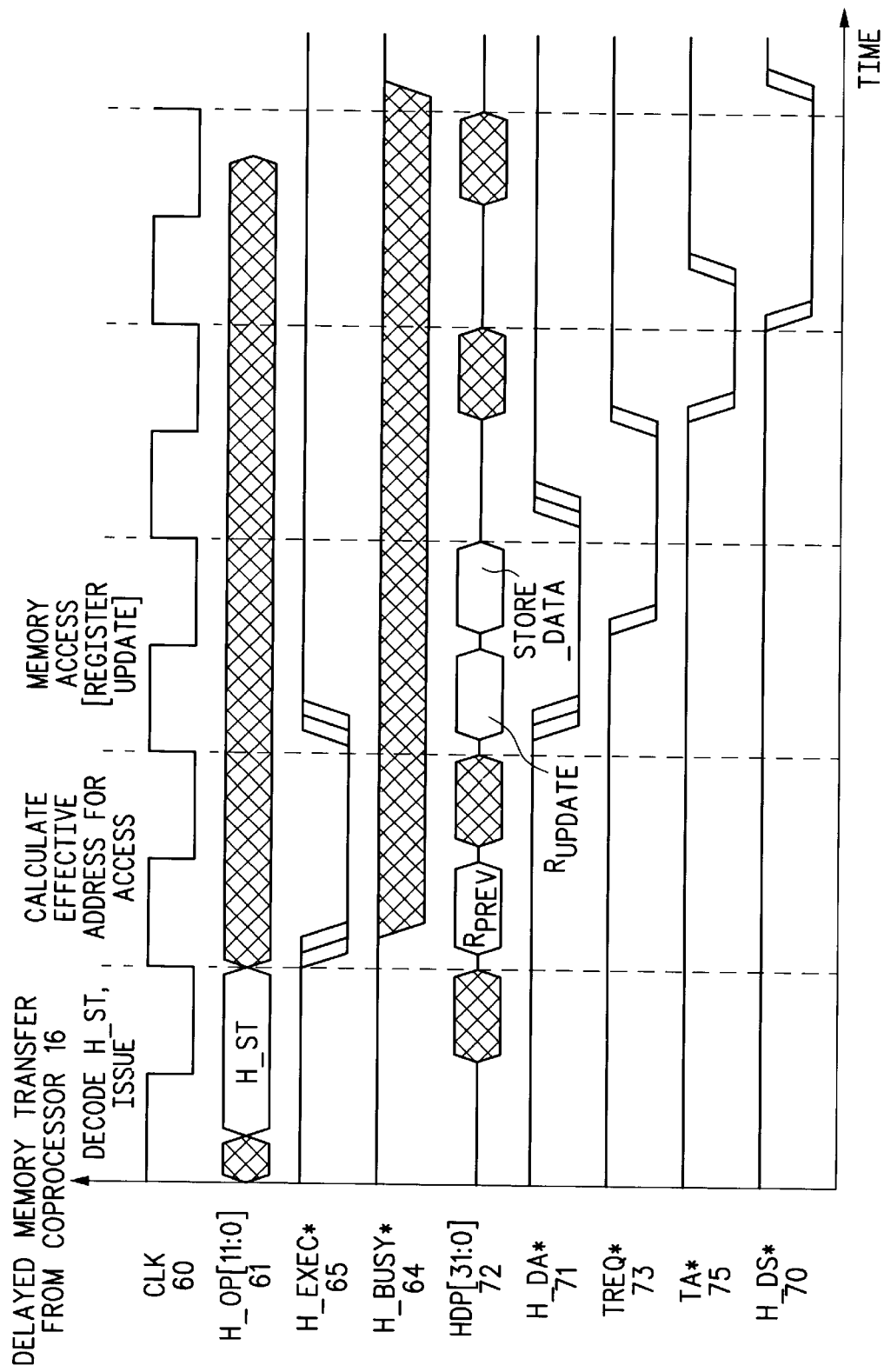
FIG. 20 is a timing diagram that illustrates an example of a transfer with delayed store data.

FIG. 20 is a timing diagram that illustrates an example of a transfer with delayed store data.

FIG. 21 is a timing diagram that illustrates the protocol signals when the store results in an access error. Note here that the H_ERR* 69 signal is asserted. If the hardware unit aborts the instruction by asserting H_EXCP* 66 the clock where H_EXEC* 65 is asserted, the H_DA* 71 signal should not be asserted.

FIGS. 22 through 26 illustrate instructions provided as part of the instruction set to interface to a Hardware Accelerator (or coprocessor) 14. The processor 12 interprets some of the fields in the primitives, others are interpreted by the coprocessor 14 alone.

FIG. 22 illustrates an instruction format for the H_CALL primitive. This instruction is used to "call" a function implemented by a coprocessor 14. The paradigm is similar to a standard software calling convention, but in a hardware context. The H_CALL primitive is interpreted by both the processor 12 and the coprocessor 14 to transfer a list of "call parameters" or arguments from the processor 12 and initiate a particular function in the coprocessor 14.

The UU and CODE fields of the instruction word are not interpreted by the processor 12, these are used to specify a coprocessor 14 specific function. The UU field may specify a specific coprocessor 14, 16, and the CODE field may specify a particular operation. The CNT field is interpreted by both the processor 12 and the coprocessor 14, and specifies the number of register arguments to pass to the coprocessor 14.

Arguments are passed from the general registers 46 beginning with R4 and continuing through R(4+CNT−1). Up to seven parameters or registers 46 may be passed in a single H_CALL invocation.

The H_CALL instruction can be used to implement modular module invocation. Usage of this type of interface has long been known to result in software systems with higher reliability and fewer bugs. Function parameters are usually best passed by value. This significantly reduces side-effects. In many cases, modem compilers for block-structured languages such as C and C++ pass short sequences of parameters or arguments to invoked functions or subroutines in registers 46. This technique can be implemented with the H_CALL instruction. A compiler can be configured to load up to seven parameters or arguments into successive registers 46 starting at R4, then generating the H_CALL instruction, which replaces the standard compiler generated subroutine linkage instruction.

FIG. 23 illustrates an instruction format for the H_RET primitive. This instruction is used to "return from" a function implemented by a coprocessor 14. The paradigm is similar to the software calling convention used by the processor 12, but in a hardware context. The H_RET primitive is interpreted by both the processor 12 and the coprocessor 14 to transfer a list of "return parameters" or values to the processor 12 from a coprocessor 14.

The UU and CODE fields of the instruction word are not interpreted by the processor 12, these are used to specify a coprocessor 14 specific function. The UU field may specify a hardware unit, and the CODE field may specify a particular operation or set of registers 46 in the coprocessor 14 to return. The CNT field is interpreted by both the processor 12 and the coprocessor 14, and specifies the number of register 46 arguments to pass from the coprocessor 14 to the processor 12.

Arguments are passed to the processor 12 general registers 46 beginning with R4 and continuing through R(4+CNT−1). Up to seven parameters (or register contents) may be returned.

As with the H_CALL instruction, the H_RET instruction can also be used to implement modular programming. Structured programming requires that function return values are best passed back to a calling routine by value. This is often done efficiently by compilers by placing one or more return values in registers for a subroutine or function return. It should be noted though that traditional structured programming expects a subroutine or function to return immediately after the subroutine or function invocation. In the case of coprocessors 14, execution is often asynchronous with that of the invoking processor 12. The H_RET instruction can be used to resynchronize the processor 12 and coprocessor 14. Thus, the processor 12 may load one or more registers 46, activate the coprocessor 14 with one or more H_CALL instructions, execute unrelated instructions, and then resynchronize with the coprocessor 14 while receiving a resulting value or values from the coprocessor 14 by issuing the H_RET instruction.

FIG. 24 illustrates an instruction format for the H_EXEC primitive. This instruction is used to initiate a function or enter an operating mode implemented by an Accelerator. The H_EXEC instruction can be used to control a function in a specific coprocessor 14, 16 specified by a UU field. The code field is not interpreted by the processor 12 but is rather reserved for the designated coprocessor 14, 16. The UU and CODE fields of the instruction word are not interpreted by the processor 12, these are used to specify a coprocessor 14 specific function. The UU field may specify a specific coprocessor 14, 16, and the CODE field may specify a particular operation.

FIG. 25 illustrates an instruction format for the H_LD instruction. This instruction is used to pass a value from memory 18 to a coprocessor 14 without temporarily storing the memory operand in a General Purpose Register (GPR) 46. The memory operand is addressed using a base pointer and an offset.

The H_LD instruction performs a load of a value in memory 18, and passes the memory operand to the coprocessor 14 without storing it in a register 46. The H_LD operation has three options, w- word, h- half word and u- update. Disp is obtained by scaling the IMM2 field by the size of the load, and zero-extending. This value is added to the value of Register RX and a load of the specified size is performed from this address, with the result of the load passed to the hardware interface 28. For halfword loads, the data fetched is zero-extended to 32-bits. If the .u option is specified, the effective address of the load is placed in register RX 46 after it is calculated.

The UU field of the instruction word is not interpreted by the processor 12, this field may specify a specific coprocessor 14, 16. The Sz field specifies the size of the operand (halfword or word only). The Disp field specifies an unsigned offset value to be added to the content of the register specified by the Rbase field to form the effective address for the load. The value of the Disp field is scaled by the size of the operand to be transferred. The Up field specifies whether the Rbase register 46 should be updated with the effective address of the load after it has been calculated. This option allows an "auto-update" addressing mode.

FIG. 26 illustrates an instruction format for the H_ST instruction. This instruction is used to pass a value from a coprocessor 14 to memory 18 without temporarily storing the memory operand in a processor 12 register 46. The memory operand is addressed using a base pointer and an offset.

The UU field of the instruction word is not interpreted by the processor 12. Rather this field may specify a specific coprocessor 14, 16. The Sz field specifies the size of the operand (halfword or word only). The Disp field specifies an unsigned offset value to be added to the content of the register 46 specified by the Rbase field to form the effective address for the store. The value of the Disp field is scaled by the size of the operand to be transferred. The Up field specifies whether the Rbase register should be updated with the effective address of the store after it has been calculated. This option allows an "auto-update" addressing mode.

The H_ST instruction performs a store to memory 18, of an operand from a coprocessor 14 without storing it in a register 46. The H_ST operation has three options, w- word, h- half word and u- update. Disp is obtained by scaling the IMM2 field by the size of the store and zero-extending. This value is added to the value of Register RX and a store of the specified size is performed to this address, with the data for the store obtained from the hardware interface. If the .u option is specified, the effective address of the load is placed in register RX after it is calculated.

The H_LD instruction and the H_ST instruction provide an efficient mechanism to move operands from memory 18 to a coprocessor 14 and from a coprocessor 14 to memory 18 without the data being moved routing through registers 46. The offset and indexing provisions provide a mechanism for efficiently stepping through arrays. Thus, these instructions are especially useful within loops. Note should be made that both instructions synchronize the processor 12 with the coprocessor 14 for every operand loaded or stored. If this is not necessary or even preferred, one may alternatively stream data to the coprocessor 14 by repeatedly loading a designated register or registers 46 with data from memory 18, and have the coprocessor 14 detect these loads since the coprocessor interface bus 30 is also used for register snooping.

Those skilled in the art will recognize that modifications and variations can be made without departing from the spirit of the invention. Therefore, it is intended that this invention encompass all such variations and modifications as fall within the scope of the appended claims.

What is claimed is:

1. In a processor coupled to a system bus and adapted to cooperate with a coprocessor coupled thereto via a coprocessor bus, wherein said coprocessor bus is separate from the system bus, in the execution of at least one instruction comprising a count field and a code field, a method for executing said instruction comprising the steps of:

receiving said instruction;

providing to said coprocessor, via a first cycle on said coprocessor bus, said count and code fields;

if the count field has a value, n, greater than zero, receiving from said coprocessor, via a second cycle on said coprocessor bus, a first operand; and completing said instruction.

2. The method of claim 1 wherein said instruction has the mnemonic H_RET.

3. The method of claim 1 further comprising the step of receiving a first input signal from the coprocessor via said coprocessor bus during said first cycle.

4. The method of claim 3, wherein, if the first input signal received from the coprocessor via the coprocessor bus during said first cycle has a first state, then repeating said first cycle, wherein the step of repeating said first cycle includes:

providing to said coprocessor, via said first cycle on said coprocessor bus, said count and code fields; and receiving said first input signal from the coprocessor via said coprocessor bus during said first cycle.

5. The method of claim 4 wherein, if the first input signal received from the coprocessor via the coprocessor bus during said first cycle has a second state, then providing to said coprocessor, via said second cycle on said coprocessor bus, a first output signal.

6. The method of claim 5 further characterized in that the first output signal is selectively provided to the coprocessor via said second cycle on said coprocessor bus.

7. The method of claim 4 further comprising the steps of:

if the count field value, n, is greater than one, then, on each of (n−1) cycles on said coprocessor bus:

receiving from the coprocessor, via said coprocessor bus, a second input signal, wherein if the second input signal has a first state, then receiving from the coprocessor, via said coprocessor bus, a next one of (n−1) operands.

8. The method of claim 7 wherein, if the second input signal received from the coprocessor via the coprocessor bus during a cycle, m, of said (n−1) cycles, has a second state, then repeating said cycle m, wherein said step of repeating said cycle m includes:

receiving from the coprocessor, via said coprocessor bus, said second input signal; and if said second input signal has the first state, receiving from the coprocessor, via said coprocessor bus, the operand m.

9. The method of claim 1 further comprising the steps of:

if a count field value, n, is greater than one, then, on each of (n−1) cycles on said coprocessor bus:

receiving from the coprocessor, via said coprocessor bus, a first input signal, wherein if the first input signal has a first state, then receiving from the coprocessor, via said coprocessor bus, a next one of (n−1) operands.

10. The method of claim 9 wherein, if the first input signal received from the coprocessor via the coprocessor bus during a cycle, m, of said (n−1) cycles, has a second state, then repeating said cycle m, wherein said step of repeating said cycle m includes:

receiving from the coprocessor, via said coprocessor bus, said first input signal; and if said first input signal has the first state, then receiving from the coprocessor, via said coprocessor bus, the operand m.

11. The method of claim 1 wherein the processor is adapted to cooperate with a plurality of coprocessors coupled thereto via said coprocessor bus in the execution of said instruction, the method further comprising the step of:

providing to said plurality of coprocessors, via said coprocessor bus during said first cycle, an identifier field having a value which uniquely identifies a selected one of said plurality of coprocessors.

12. The method of claim 1 wherein the processor includes a plurality of registers for storing selected operands, and wherein the step of receiving said first operand from said coprocessor via said coprocessor bus during said second cycle is further characterized as:

if the count field has a value, n, greater than zero, receiving from said coprocessor, via a second cycle on said coprocessor bus, an operand and storing said operand in a predetermined one of said plurality of registers.

13. The method of claim 1 further including the step of:

providing to the coprocessor, during at least a portion of said second cycle on said coprocessor bus, a first output signal.

* * * * *